(12) United States Patent
Barron et al.

(10) Patent No.: US 11,678,703 B2
(45) Date of Patent: *Jun. 20, 2023

(54) COATED SUBSTRATES AND ARTICLES WITH ANTI-VIRAL PROPERTIES, AND FABRICATION PROCESSES

(71) Applicant: FXI INC. LIMITED, London (GB)

(72) Inventors: Andrew R. Barron, Swansea (GB); Iain Powner, Newcastle under Lyme (GB); Wafaa Al-Shatty, London (GB); Donald A. Hill, London (GB); Sajad Kiani, Swansea (GB); Andrius Stanulis, Swansea (GB); Lee Tretheway, Newcastle under Lyme (GB); Shirin Alexander, London (GB); Steve Winston, London (GB)

(73) Assignee: FXI INC. LIMITED, London (GB)

( * ) Notice: Subject to any disclaimer, the term of this patent is extended or adjusted under 35 U.S.C. 154(b) by 29 days.

This patent is subject to a terminal disclaimer.

(21) Appl. No.: 17/336,169

(22) Filed: Jun. 1, 2021

(65) Prior Publication Data

US 2022/0030980 A1 Feb. 3, 2022

Related U.S. Application Data

(63) Continuation of application No. 17/314,874, filed on May 7, 2021.

(60) Provisional application No. 63/058,550, filed on Jul. 30, 2020.

(51) Int. Cl.
| | | |
|---|---|---|
| *A41D 13/11* | (2006.01) | |
| *A01N 25/34* | (2006.01) | |
| *A62B 23/02* | (2006.01) | |
| *A01N 59/16* | (2006.01) | |
| *A01N 25/08* | (2006.01) | |
| *D06M 11/83* | (2006.01) | |
| *D06M 23/08* | (2006.01) | |
| *D06M 101/32* | (2006.01) | |

(52) U.S. Cl.
CPC .......... *A41D 13/1192* (2013.01); *A01N 25/08* (2013.01); *A01N 25/34* (2013.01); *A01N 59/16* (2013.01); *A62B 23/025* (2013.01); *D06M 11/83* (2013.01); *D06M 23/08* (2013.01); *A41D 2500/30* (2013.01); *D06M 2101/32* (2013.01); *D06M 2200/00* (2013.01)

(58) Field of Classification Search
CPC ........ A01N 25/08; A01N 25/34; A01N 59/16; A41D 13/1192; A62B 23/025
See application file for complete search history.

(56) References Cited

U.S. PATENT DOCUMENTS

| | | |
|---|---|---|
| 3,871,950 A | 3/1975 | Hashino et al. |
| 4,615,937 A | 10/1986 | Bouchette |
| 4,736,467 A | 4/1988 | Schwarze et al. |
| 4,856,509 A | 8/1989 | Lemelson |
| 5,767,167 A | 6/1998 | Ferry |
| 5,783,502 A | 7/1998 | Swanson |
| 5,851,395 A | 12/1998 | Kawase et al. |
| 6,102,039 A | 8/2000 | Springett et al. |
| 6,379,794 B1 | 4/2002 | Girgis |
| 6,770,773 B2 | 8/2004 | Rose et al. |
| 7,029,516 B2 | 4/2006 | Campbell et al. |
| 7,115,764 B2 | 10/2006 | Barron et al. |
| 8,227,360 B2 | 7/2012 | Takashima et al. |
| 10,471,703 B2 | 11/2019 | Bachelder et al. |
| 2005/0079379 A1 | 4/2005 | Wadsworth et al. |
| 2008/0295843 A1 | 12/2008 | Haas |
| 2010/0018533 A1 | 1/2010 | Biedermann et al. |
| 2019/0375639 A1 | 12/2019 | Orbaek White et al. |

FOREIGN PATENT DOCUMENTS

| | | |
|---|---|---|
| EP | 1953286 A1 | 8/2008 |
| WO | 2002/058812 A2 | 8/2002 |
| WO | 2005065730 A1 | 7/2005 |
| WO | 2010138426 A1 | 12/2010 |
| WO | 2012087812 A2 | 6/2012 |
| WO | 2018033793 A1 | 2/2018 |
| WO | 2021206634 A1 | 10/2021 |

OTHER PUBLICATIONS

Samuel J. Maguire-Boyle, Michael V. Liga, Qilin Li and Andrew R. Barron, "Alumoxane/ferroxane nanoparticles for the removal of viral pathogens: the importance of surface functionality to nanoparticle activity", Nanoscale, 2012, 4, 5627-5632. (Year: 2012).*
Jialiang Zhou, Zexu Hu, Fatemeh Zabihi, Zhigang Chen and Meifang Zhu, "Progress and Perspective of Antiviral Protective Material ", Advanced Fiber Materials (2020) 2:123-139. (Year: 2020).*
Maguire-Boyle, Samuel J., "Fabrication of petrochemical and viral resistant membranes", Masters Thesis, Rice University, 2012. (Year: 2012).*

(Continued)

*Primary Examiner* — Mina Haghighatian
*Assistant Examiner* — Nathan W Schlientz
(74) *Attorney, Agent, or Firm* — Patterson + Sheridan, LLP

(57) ABSTRACT

Embodiments of the present disclosure generally relate to coated substrates having, e.g., anti-viral properties, to articles including the coated substrates, and to processes for making such coated substrates and articles. In an embodiment, a mask for preventing infection by a virus is provided. The mask includes a coated substrate having a breathing resistance (95 L/min, EN 149:2001) of about 6 mbar or less and a water droplet absorption time of less than about 5 seconds. The coated substrate includes a non-woven fabric having a weight of about 120 g/m² or less according to ASTM D3776, and mineral oxide particles, iron oxide particles, or both, coupled to at least a portion of the non-woven fabric.

20 Claims, 11 Drawing Sheets
(1 of 11 Drawing Sheet(s) Filed in Color)

(56) References Cited

OTHER PUBLICATIONS

Wang, et al, A novel coronavirus outbreak of global health concern, Lancet 2020, 395, 470-473.
Daughney, et al, Adsorption and precipitation of iron from seawater on a marine bacteriophage (PWH3A-P1), Mar. Chem., 2004, 91, 101-115.
Warren, et al., Continuum between Sorption and Precipitation of Fe(III) on Microbial Surfaces, Environ. Sci. Technol., 1998, 32, 2331-2337.
Daughney, et al, The effect of growth phase on proton and metal adsorption by Bacillus subtilis, Geochim. Cosmochim. Acta., 2001, 65, 1025-1035.
Fein, et al, The effect of Fe on Si adsorption by Bacillus subtilis cell walls: insights into non-metabolic bacterial precipitation of silicate minerals, Chem. Geol., 2002, 182, 265-273.
Wells, et al, The distribution of colloids in the North Atlantic and Southern Oceans, Limnol. Oceanogr. 1994, 39, 286-302.
Wu, et al, Spatial and temporal distribution of iron in the surface water of the northwestern Atlantic Ocean, Geochim. Cosmochim. Acta., 1996, 60, 2729-2741.
Wu, et al, Soluble and Colloidal Iron in the Oligotrophic North Atlantic and North Pacipc, Science, 2001, 292, 847-849.
Nishioka, et al, , Size-fractionated iron concentrations in the northeast Pacific Ocean: distribution of soluble and small colloidal iron, Mar. Chem., 2001, 74, 157-179.
Maguire-Boyle, et al., A new functionalization strategy for oil/water separation membranes, J. Membrane Sci., 2011, 382, 107-115.
Maguire-Boyle, et al., Alumoxane/ferroxane nanoparticles for the removal of viral pathogens: the importance of surface functionality to nanoparticle activity, Nanoscale, 2012, 4, 5627-5632.
Bethley, et al., Organometallics, 1997, 16, 329-341.
Koide, et al., Organometallics, 1995, 14, 4026-4029.
DeFriend, et al., J. Membrane Sci., 2003, 224, 11-28.
Al-Shatty, et al, ACS Omega, 2017, 2, 2507-2514.
Katoh, et al, Front. Public Health, 2019, 7, 121, 6 pp.
International Search Report and Written Opinion dated Nov. 9, 2021 for Application No. PCT/IB2021/056946.
O'Dowd et al., "Face masks and Respirators in the Fight Against the COVID-19 Pandemic: A Review of Current Materials, Advances and Future Perspectives", Materials, vol. 13, No. 15, Jan. 1, 2020, p. 3363.

\* cited by examiner

COATED SUBSTRATES AND ARTICLES WITH ANTI-VIRAL PROPERTIES, AND FABRICATION PROCESSES

CROSS-REFERENCE TO RELATED APPLICATIONS

This application is a continuation of co-pending U.S. patent application Ser. No. 17/314,874, filed May 7, 2021, which claims benefit of U.S. Provisional Application No. 63/058,550, filed Jul. 30, 2020, all of which are herein incorporated by reference in their entireties.

BACKGROUND

Field

Embodiments of the present disclosure generally relate to coated substrates having, e.g., anti-viral properties, to articles including the coated substrates, and to processes for making such coated substrates and articles.

Description of the Related Art

Viral and infectious diseases, such as influenza, occur when an organism's body is invaded by pathogenic viruses, and infectious virus particles (virions) attach to and enter susceptible cells. The inhalation of air contaminated by harmful virus and/or other micro-organisms is a common route for infection of human beings, particularly health workers and others who work with infected humans or animals. Global public health concerns include the Coronavirus disease 2019 (COVID-19), which is an infectious disease caused by severe acute respiratory syndrome coronavirus 2 (SARS-CoV-2). The virus is primarily transmitted via small droplets produced by, e.g., coughing, sneezing, and talking. With the outbreak of the COVID-19 virus, the spread of airborne pathogens has become even a greater concern.

Personal protective equipment (PPE), such as masks and wearable garments, is utilized to minimize exposure to viruses and infectious diseases. However, the current supply of these materials, their effectiveness, and their breathability characteristics are often considered deficient for one or more reasons. For example, conventional surgical masks are designed for bacteria and not viruses and do not block small virus particles that may be transmitted by coughing and sneezing. Conventional N95 masks are expensive, in short supply, and not reusable. Further, persons with respiratory and cardiac conditions have difficulty breathing while wearing N95 masks. In addition, filters used in air-handling equipment and heating, ventilation, and air conditioning (HVAC) systems are known to propagate airborne bacteria (e.g., *Legionella*) and viral diseases. While high efficiency particulate air ("HEPA") air filters trap smaller particles than conventional filters, transmission of airborne bacteria and viruses remains a problem. Conventional PPE and filters for air-handling equipment are also ineffective in trapping particles. In particular, trapping viruses in materials designed for breathing is challenging because the filter must allow air transmission while trapping viruses. Further, the adhesion of blood and bodily fluids from virus-infected patients to the surface of protective clothing still imposes a risk of pathogen transmission.

There is a need for new and improved materials having anti-viral properties and to processes for making such materials that overcome one or more deficiencies in the art.

SUMMARY

Embodiments of the present disclosure generally relate to coated substrates having, e.g., anti-viral properties, to articles including the coated substrates, and to processes for making such coated substrates and articles.

In an embodiment, a mask for preventing infection by a virus is provided. The mask includes a coated substrate having a breathing resistance (95 L/min, EN 149:2001) of about 6 mbar or less and a water droplet absorption time of less than about 5 seconds. The coated substrate includes a non-woven fabric having a weight of about 120 $g/m^2$ or less according to ASTM D3776, and mineral oxide particles, iron oxide particles, or both, coupled to at least a portion of the non-woven fabric.

In another embodiment, a wearable garment for preventing infection by a virus is provided. The wearable garment includes a coated substrate having a breathing resistance (95 L/min, EN 149:2001) of about 6 mbar or less. The coated substrate includes a substrate having a weight of about 120 $g/m^2$ or less according to ASTM D3776. The coated substrate further includes mineral oxide particles, iron oxide particles, or both, coupled to at least a portion of the substrate.

In another embodiment, a process for making a mask for preventing infection by a virus, comprising introducing mineral oxide particles and iron oxide particles to a non-woven fabric via a single solution, drying or curing the non-woven fabric to form a coated substrate, the coated substrate having a breathing resistance (95 L/min, EN 149:2001) of about 6 mbar or less.

In an embodiment a coated substrate is provided. The coated substrate can include a woven fabric, a non-woven fabric or both. The coated substrate can include mineral oxide particles and/or iron oxide particles. The mineral oxide particles and/or iron oxide particles can be functionalized.

In another embodiment, a coated substrate is provided. The coated substrate includes a substrate having a weight of about 120 $g/m^2$ or less according to ASTM D3776, mineral oxide particles, iron oxide particles, or both, coupled to at least a portion of the substrate, wherein the coated substrate has a breathing resistance (95 L/min, EN 149:2001) of about 6 mbar or less.

In another embodiment, a process for making a coated substrate is provided. The process includes introducing mineral oxide particles and iron oxide particles with a substrate, the substrate having a weight of about 120 $g/m^2$ or less according to ASTM D3776. The process further includes drying or curing the substrate to form the coated substrate, the coated substrate having a breathing resistance (95 L/min, EN 149:2001) of about 6 mbar or less.

In another embodiment, a filter is provided. The filter includes a non-woven fabric having a weight from about 15 $g/m^2$ to about 120 $g/m^2$ according to ASTM D3776. The filter further includes mineral oxide particles coupled to at least a portion of the non-woven fabric, the mineral oxide particles comprising an alumoxane and an organic functional group selected from the group consisting of cysteic acid, 3,5-dihydroxybenzoic acid, para-hydroxybenzoic acid, malonic acid, carboxylates thereof, and combinations thereof. The filter further includes iron oxide particles coupled to the at least a portion of the non-woven fabric, the iron oxide particles comprising a ferroxane and an organic functional group selected from the group consisting of cysteic acid, 3,5-dihydroxybenzoic acid, para-hydroxybenzoic acid, malonic acid, carboxylates thereof, and combinations thereof. The filter has a breathing resistance (95 L/min, EN 149:2001) of about 6 mbar or less.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

Figure 1:
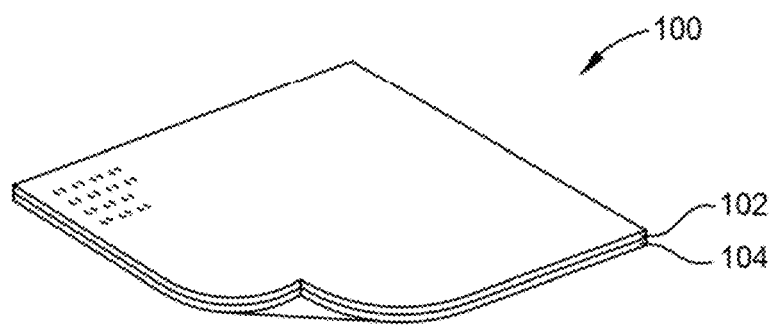
FIG. 1 is a schematic of an example article, shown as a two-ply material, according to at least one embodiment of the present disclosure.

Figures included herein illustrate various embodiments of the disclosure. It is contemplated that elements and features of one embodiment may be beneficially incorporated in other embodiments without further recitation.

DETAILED DESCRIPTION

Embodiments of the present disclosure generally relate to coated substrates having, e.g., anti-viral properties, to articles including the coated substrates, and to processes for making such coated substrates and articles. The inventors have found new and improved materials, such as coated substrates and articles comprising coated substrates, for use in preventing (or at least mitigating) the spread of viral and infectious diseases. These coated substrates can be used in, e.g., filters and protective materials. Briefly, and in some embodiments, the coated substrates include a substrate (e.g., a fabric, a polymer, a non-polymer, and/or a fiber material) having iron oxide particles and mineral oxide particles coupled thereto or otherwise dispersed thereon or therein. The mineral oxide particles and/or iron oxide particles are functionalized with, e.g., an organic functional group. The iron oxide particles, with or without functionalization, act to trap a virus. The mineral oxide particles, with or without functionalization, have hydrophilic (or superhydrophilic) properties that act to collapse aspirated droplets containing the virus. The substrate having mineral oxide particles and iron oxide particles coupled thereto can be a portion of an article, such as a wearable garment or face mask, or can be a portion of an air filter for air-handling equipment and HVAC systems.

Conventional protective materials such as filters and face masks lack the ability to trap viruses while simultaneously enabling the wearer to breathe regularly or without difficulty. The ability to trap viruses in a fabric designed for breathing is difficult because the filter must allow air transmission while trapping viruses; however, trapping of a virus is difficult, due to its dispersion in micron size water droplets (aerosols), which can pass through conventional materials and into the respiratory system. To overcome these challenges, the articles (e.g., filters, protective materials, etc.) described herein enable collapsing of the water droplet onto a material of breathable porosity and immobilization of the active virus particle. Moreover, and in contrast to conventional materials, the coated substrates and articles including coated substrates described herein, can be manufactured at low cost and are reusable as the coated substrates can be washed in various detergents without losing their air transmission and virus trapping properties.

The inventors unexpectedly found that various materials can be utilized as substrates for disposing iron oxide particles and mineral oxide particles thereon. For example, non-woven materials exhibit a very low rejection (~20% or less rejection) of virus particles as would be expected of materials having pores, openings, or holes therein. However, when the non-woven materials include iron oxide particles and/or mineral oxide particles coupled or otherwise disposed on or in the non-woven materials the amount of virus particle rejection unexpectedly improves to about 75% or more. Significantly, non-woven fabrics are also breathable as opposed to conventional materials used to reject virus particles.

Further, woven materials, which are characterized by a "dense mesh," also show significant improvements in rejecting virus particles. For example, woven materials without iron oxide particles and/or mineral oxide particles show ~60% rejection of virus particles. However, when the woven materials include functionalized iron oxide particles and/or functionalized mineral oxide particles coupled or otherwise disposed on or in the woven materials, the amount of virus particle rejection improves to about 75% or more.

Coated Substrates and Articles

Embodiments of the present disclosure generally relate to articles, such as filters, facemasks, and protective materials, useful for trapping and immobilizing, e.g., virus particles. The articles generally include a substrate, mineral oxide particles, and iron oxide particles. The substrate having mineral oxide particles and/or iron oxide particles coupled thereto is referred to as a coated substrate or at least partially coated substrate. In certain embodiments, the mineral oxide particles are functionalized and/or the iron oxide particles are functionalized.

The substrate is or includes woven materials, non-woven materials, and/or melt blown materials, such as woven fabrics, non-woven fabric, melt-blown fabrics, woven synthetic and natural fibers, non-woven synthetic and natural fibers, polymers (including copolymers, tripolymers, and higher-order polymers), paper, cellular plastics, or combinations thereof. In some embodiments, the substrate includes one or more porous materials. The substrate can be in the form of a one-ply, two-ply, or multi-ply fabric, fiber, polymer, etc. In at least one embodiment, the substrate is formed as a laminate of a plurality of layers. In these and other embodiments, one or more layers of the plurality of layers is coated with particles as described herein. The substrate serves as, e.g., a barrier to prevent, mitigate, or reduce passage of virus particles either from a person to the outside environment or from the outside environment to a person.

Illustrative, but non-limiting, examples of materials useful as a substrate include natural fibers/polymers such as cellulosic fibers and proteinacious fibers, e.g., wool, silk, cotton, hemp, and combinations thereof. Illustrative, but non-limiting, examples of materials useful as a substrate also include synthetic fibers/polymers such as polymers (homopolymers or copolymers), such as polyamides including nylon (such as nylon 6 and nylon 66), poly(p-phenylene terephthalamide) (e.g., Kevlar™, Twaron™) and poly (m-phenylenediamine isophthalamide) (e.g., Nomex™); polyolefins such as polypropylene; polyesters such as polyethylene terepthalate (PET); polyureas and block copolymers thereof such as polyurethaneureas; polyurethanes, including polyurethane block copolymers; polyethers, including polyether copolymers such as polyether-polyurea copolymers; acrylics; synthetic cellulose-derived fibers such as rayon; and combinations thereof. In some embodiments, the material or combinations of materials can be woven, non-woven, knitted, felted, thermally bonded, hydroentangled, spunbonded, meltblown, electrospun or formed by other nonwoven processes, or combinations of processes, into, e.g., a fiber, filament, or a fabric. These and other substrates can be used for, e.g., wearable materials as well as materials for air-handling systems and HVAC systems.

In some embodiments, non-woven materials include polyethylene, polypropylene, polyester, cotton, and/or combinations thereof, such as polyester poplin silver 62. The non-woven material can also include cellulose and/or viscose. In some embodiments, woven materials include polyester, Spandex™, Nomex™, Montana fleece white 60, cotton, and/or combinations thereof.

In some embodiments, the substrate includes one or more spunbond non-woven materials. A spunbond, also called spunlaid, non-woven material is made in one continuous process. For example, fibers are spun and then directly dispersed into a web by deflectors or can be directed with air streams. In these or other embodiments, the substrate includes one or more spunlace non-woven materials. A spunlace non-woven material is a non-woven cloth, and is the direct use of polymer slices, short fibers and/or filaments into a network of fiber by air, mechanical, spunlace, acupuncture, and/or hot-rolled reinforcement. The decreased cost and ease of manufacture associated with spunbond or spunlace as compared to melt-blown fabric in traditional masks can be beneficial. However, the coated substrates described herein can include melt-blown materials.

Non-woven materials contemplated for implementation according to the embodiments described herein include those manufactured by drylaid, wetlaid, airlaid, and/or spunlaid processes. For these methods of manufacture, a range of bonding processes can be employed to bond the fibers together, including thermobonding, air-through bonding, chemically bonding, needlepunching, stitchbonding, hydroentangling, hydrogenbonding, and/or multibonding.

The coated substrate defines and/or can be at least a portion of one or more components of a filter for air-handling equipment. For example, the coated substrate defines, and/or can be at least a portion of, one or more components of a filter for use in, e.g., an aircraft, a watercraft, a spacecraft, a land vehicle, in an HVAC system, a building, a home, or other locations where filters are utilized or air filtration is desired. The coated substrate defines and/or can be at least a portion of one or more components of wearable protective materials and PPE, such as face coverings (e.g., facemasks, face shields, respirators, surgical masks, bandanas), garments (e.g., coveralls, gowns, gloves, hair coverings) and other suitable wearable materials. For example, the coated substrate can be located at or near portion(s) of a facemask that extend across nasal and/or mouth regions of a user/wearer. In one embodiment, the coated substrate is a portion of a professional respirator such as N95 masks/respirators and filtering facepiece (FFP) masks/respirators. An N95 mask or N95 respirator is a particulate-filtering facepiece respirator that meets the U.S. National Institute for Occupational Safety and Health (NIOSH) N95 classification of air filtration for filtering at least 95% of airborne particles. An FFP mask (also referred to as a respiratory protection mask or simply, a respirator) is a type of protective mask certified by the European Union that serves to protect against particulates such as dust particles. Examples of FFP masks/respirators include FFP1, FFP2, and FFP3. In some embodiments, the coated substrate is a component in a filter cartridge respirator in which the fabric or laminate of the disclosure is inserted as a cartridge into, e.g., a plastic, silicone or rubber molded component that is designed to fit the face of the user.

The article, such as air filters and wearable materials, can be in the form of a single layer or multilayer structure in which at least one of the layers includes the coated substrate having mineral oxide particles (with or without functionalization) and/or iron oxide particles (with or without functionalization), or a combination thereof, coupled to the substrate. The coated substrate, or article comprising the coated substrate, can be washed and/or cleaned such that the coated substrate and/or article is re-useable.

For use in wearable articles such as masks and respirators, the substrate is breathable with minimal restriction as measured by pressure drop across the substrate. Pressure drop is a measure of breathing resistance according to EN 149: 2001.

In some embodiments, the maximum breathing resistance (inhalation or exhalation at 95 L/min according to EN 149:2001) of the substrate, with or without mineral oxide and iron oxide particles, is about 10 millibar (mbar) or less, such as about 9 mbar or less, such as about 8 mbar or less, such as about 7 mbar or less, such as about 6 mbar or less, such as about 5 mbar or less, such as about 4 mbar or less, such as about 3 mbar or less, such as about 2 mbar or less, such as about 1 mbar or less.

In at least one embodiment, the maximum breathing resistance (inhalation or exhalation at 160 L/min according to EN 149:2001) of the substrate, with or without mineral oxide and iron oxide particles, is about 1.0 mbar or less, such as about 0.5 mbar or less.

In some embodiments, the maximum breathing resistance (inhalation or exhalation at 10 L/min according to EN 149:2001) of the substrate, with or without mineral oxide and iron oxide particles, is about 1.5 mbar or less, such as about 1 mbar or less, such as about 0.9 mbar or less, such as about 0.8 mbar or less, such as about 0.7 mbar or less, such as about 0.6 mbar or less, such as about 0.5 mbar or less, such as about 0.4 mbar or less, such as about 0.3 mbar or less, such as about 0.2 mbar or less, such as about 0.1 mbar or less.

In some embodiments, the weight of the substrate is about 150 g/m$^2$ or less, such as about 130 g/m$^2$ or less, such as from about 10 g/m$^2$ to about 130 g/m$^2$, such as from about 20 g/m$^2$ to about 120 g/m$^2$, such as from about 30 g/m$^2$ to about 110 g/m$^2$, such as from about 40 g/m$^2$ to about 100 g/m$^2$, such as from about 50 g/m$^2$ to about 90 g/m$^2$, such as from about 60 g/m$^2$ to about 80 g/m$^2$. In at least one embodiment, the weight of the substrate is about 15 g/m$^2$ to about 100 g/m$^2$, such as from about 20 g/m$^2$ to about 80 g/m$^2$. Weight of the substrate is measure by ASTM D3776.

As discussed above, mineral oxide particles and iron oxide particles are coupled to (e.g., disposed on, dispersed across, impregnated within, embedded within, or otherwise on or in) the substrate. The mineral oxide particles, with or without chemical functionalization, have hydrophilic (or superhydrophilic) characteristics that collapse aspirated droplets containing a virus and/or bacteria. The iron oxide particles, with or without chemical functionalization, act to trap the virus. The iron oxide particles, when bound to an organic functional group, can also exhibit hydrophilic (or superhydrophilic) characteristics. In the present disclosure, a superhydrophilic material refers to a material (with or without mineral oxide particles and/or iron oxide particles) having a water droplet absorption time of less than about 1 second.

Suitable iron oxides useful to coat or at least partially coat the substrate can include ferroxanes. The ferroxane can be, or be derived from, e.g., iron(III) oxide, ferric oxide, iron oxide hydroxide, lepidocrocite, goethite, siderogel, limonite, and combinations thereof.

Suitable mineral oxides useful to coat or at least partially coat the substrate can include alumoxanes and/or ferroxanes. The alumoxane can be, or be derived from, e.g., aluminum oxides such as alumina or aluminum oxide hydroxides, such as boehmite and diaspore. The ferroxane can be, or be derived from, e.g., iron(III) oxide, ferric oxide, and iron oxide hydroxides, such as lepidocrocite, goethite, siderogel, limonite, and combinations thereof. Combinations of the mineral oxides described herein may be advantageously implemented. For example, a combination of one or more alumoxanes and one or more ferroxanes may be utilized. In at least one embodiment, the mineral oxide used to create the hydrophilic or superhydrophilic surface is the same mineral oxide used to immobilize the viruses onto the substrate. Alternatively, and in some embodiments, the mineral oxide used to create the superhydrophilic surface is different than that used to immobilize the viruses onto the substrate.

In certain embodiments, the mineral oxide and/or iron oxide is functionalized with an organic functional group bound (covalently and/or physically) to the surface of the mineral oxide and/or iron oxide. An illustrative, but non-limiting, example of an organic functional group that can be used includes a carboxylic acid group, $RCO_2H$, or its deprotonated form as a carboxylate group, $RCO_2^-$. R can be saturated or unsaturated, substituted or unsubstituted, linear or branched, cyclic or acyclic, aromatic or non-aromatic. In some embodiments, R is a $C_1$-$C_{100}$ unsubstituted hydrocarbyl (such as $C_1$-$C_{40}$ unsubstituted hydrocarbyl, such as $C_1$-$C_{20}$ unsubstituted hydrocarbyl, such as $C_1$-$C_{10}$ unsubstituted hydrocarbyl, such as $C_1$-$C_6$ unsubstituted hydrocarbyl), a $C_1$-$C_{100}$ substituted hydrocarbyl (such as $C_1$-$C_{40}$ substituted hydrocarbyl, such as $C_1$-$C_{20}$ substituted hydrocarbyl, such as $C_1$-$C_{10}$ substituted hydrocarbyl, such as $C_1$-$C_6$ substituted hydrocarbyl), a $C_4$-$C_{100}$ unsubstituted aryl (such as $C_4$-$C_{40}$ unsubstituted aryl, such as $C_4$-$C_{20}$ unsubstituted aryl, such as $C_4$-$C_{10}$ unsubstituted aryl), or a $C_4$-$C_{100}$ substituted aryl (such as $C_4$-$C_{40}$ substituted aryl, such as $C_4$-$C_{20}$ substituted aryl, such as $C_4$-$C_{10}$). In at least one embodiment, the hydrocarbyl is linear or branched.

In at least one embodiment, and when R is a substituted hydrocarbyl or a substituted aryl, at least one carbon of the substituted hydrocarbyl or the substituted aryl has been substituted with at least one heteroatom or heteroatom-containing group, such as one or more elements from Group 13-17 of the periodic table of the elements, such as halogen (F, Cl, Br, or I), O, N, Se, Te, P, As, Sb, S, B, Si, Ge, Sn, Pb, and the like, such as $NR*_2$, $OR*$ (e.g., OH or $O_2H$), $SeR*$, $TeR*$, $PR*_2$, $AsR*_2$, $SbR*_2$, $SR*$, $SO_x$ (where x=2 or 3), $BR*_2$, $SiR*_3$, $GeR*_3$, $SnR*_3$, $PbR*_3$, and the like or where at least one heteroatom has been inserted within the hydrocarbyl radical or aryl radical such as one or more of halogen (Cl, Br, I, F), O, N, S, Se, Te, $NR*$, $PR*$, $AsR*$, $SbR*$, $BR*$, $SiR*_2$, $GeR*_2$, $SnR*_2$, $PbR*_2$, and the like, where $R*$ is, independently, hydrogen, or hydrocarbyl (e.g., $C_1$-$C_{10}$), or two or more $R*$ may join together to form a substituted or unsubstituted completely saturated, partially unsaturated, fully unsaturated, or aromatic cyclic or polycyclic ring structure.

The choice of the group R can affect the hydrophilic functionality. Suitable carboxylic acids/carboxylates useful include those described in U.S. Pat. Nos. 7,115,764 and 6,770,773 each of which is incorporated herein by reference in its entirety. Illustrative, but non-limiting, examples of carboxylic acids/carboxylates used to functionalize mineral oxides and/or functionalize iron oxides include cysteic acid, 3,5-dihydroxybenzoic acid, para-hydroxybenzoic acid, malonic acid, carboxylates thereof, derivatives thereof, and combinations thereof.

The mineral oxides, with or without functionalization, and/or the iron oxides, with or without functionalization, are added to the substrate in the form of, e.g., particles, such as nanoparticles. The mineral oxide particles and the iron oxide particles have a diameter of between about 10 nm and about 200 nm. More specifically, a median diameter of the mineral oxide particles and the iron oxide particles is between about 10 nm and about 200 nm. Upon addition of the particles to the substrate and drying/curing, the substrate becomes a coated (or at least partially coated) substrate. "Coated" can be in the form of particles coupled to, disposed on or in, dispersed across, impregnated within, embedded within, or otherwise disposed on or in, the substrate. In one embodiment, the particles are in a particulate form prior to performing a curing process but fuse together after performing the curing process.

As stated above, articles such as filters, facemasks, protective materials, etc., include a coated substrate or an at least partially coated substrate. The coated substrate or at least partially coated substrate can be in the form of a layer. This layer can be used to make multilayer articles, e.g., articles such as two-ply materials and multi-ply materials. FIG. 1 is a schematic of an article 100, shown as a two-ply material, according to at least one embodiment of the present disclosure. The article 100 includes a layer 102 including a coated or at least partially coated substrate, and a layer 104 that includes, e.g., a non-coated substrate. Examples of materials for the non-coated substrate can include those listed above for the coated substrates. Layer 102 and layer 104 can be bonded (or at least partially bonded) by mechanical, thermal, and/or adhesive methods and can be bonded in a variety of patterns. In some embodiments, layer 102 and layer 104 are not bonded.

Figure 2A:
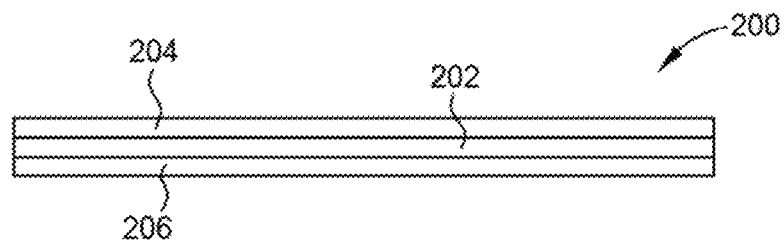
FIG. 2A is a schematic of an example article, shown as a three-ply material, according to at least one embodiment of the present disclosure.
Figure 2B:
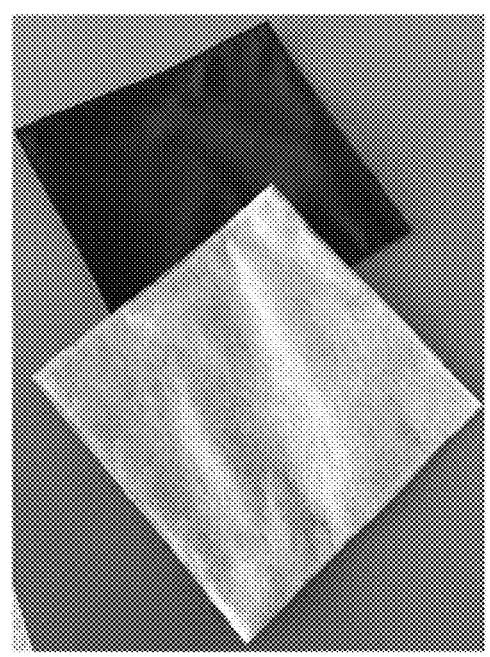
FIG. 2B is a photograph of two different three-ply materials according to at least one embodiment of the present disclosure

FIG. 2A is a schematic of an article 200, shown as a three-ply material, according to at least one embodiment of the present disclosure. The article 200 includes a first layer 202 comprising a coated or at least partially coated substrate. First layer 202 is disposed below a second layer 204 and disposed above a third layer 206. In other words, first layer 202 is disposed between second layer 204 and third layer 206. Second layer 204 and third layer 206, each, independently, include a non-coated substrate such as those listed above for the coated substrates. In one embodiment, second layer 204 and third layer 206 are made of the same material. In another embodiment, second layer 204 and third layer 206 are made of different materials. One or more of first layer 202, second layer 204, and third layer 206 can be bonded (or at least partially bonded) by mechanical, thermal, and/or adhesive methods and can be bonded in a variety of patterns. In some embodiments, one or more of first layer 202, second layer 204, or third layer 206 are not bonded. FIG. 2B is a photograph of two different three-ply materials (e.g., schematically illustrated in FIG. 2A) according to at least one embodiment of the present disclosure.

Figure 3:
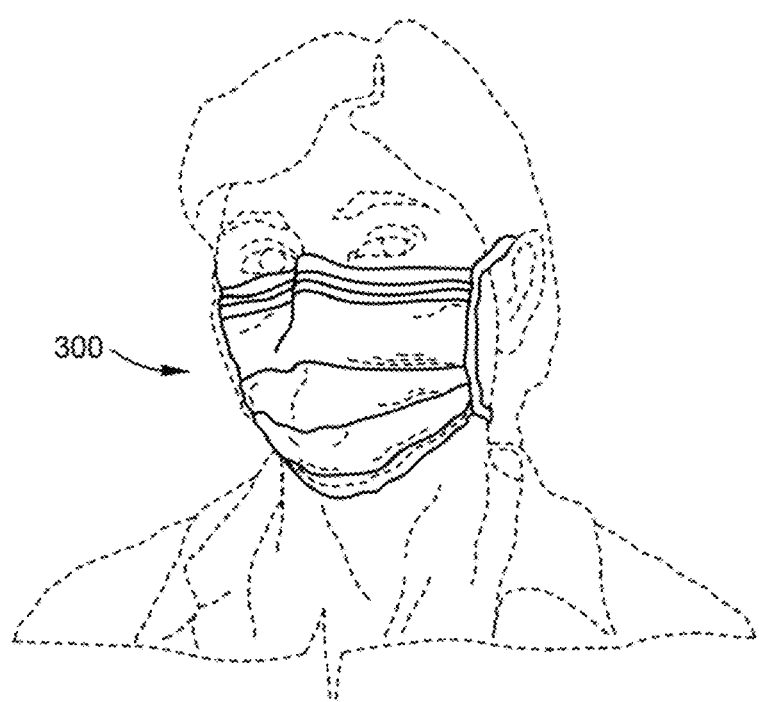
FIG. 3 is an illustration of a multi-ply surgical mask that includes a coated substrate according to at least one embodiment of the present disclosure.
Figure 4:
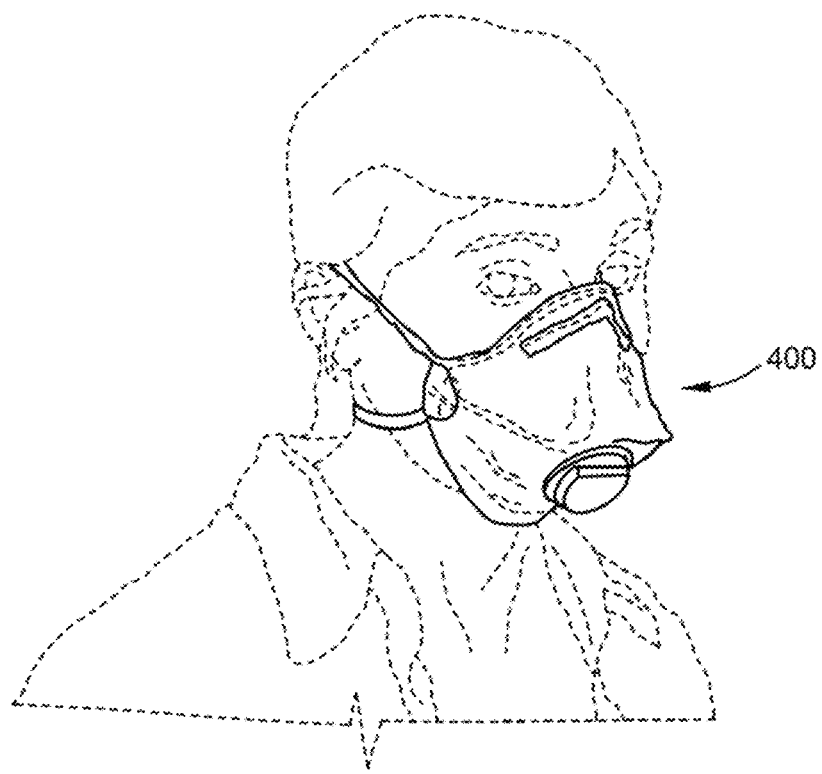
FIG. 4 is an illustration of a filtering facepiece (FFP)-type respirator that includes a coated substrate according to at least one embodiment of the present disclosure.

The coated substrate defines and/or can be at least a portion of one or more components of wearable protective materials and PPE, such as face coverings (e.g., facemasks, face shields, respirators, surgical masks, bandanas), garments (e.g., coveralls, gowns, gloves, hair covering) and other suitable wearable materials. For example, the substrate can be located at or near portion(s) of, e.g., a facemask, a surgical mask, or a respirator, that extend across nasal and/or mouth regions of a user/wearer. FIG. 3 is an illustration of an example multi-ply mask 300. At least one layer of the multi-ply mask 300 includes a coated substrate or at least a partially coated substrate as described herein. The multi-ply mask 300 can be utilized as, e.g., a surgical mask. FIG. 4 is an illustration of a respirator 400, such as an FFP-type respirator. At least one layer of the respirator 400 includes a coated substrate or at least a partially coated substrate as described herein.

The coated substrate can define and/or can be at least a portion of one or more components of a filter for, e.g., air-handling equipment. For example, the coated substrate can define, and/or can be at least a portion of, one or more components of a filter for use in an aircraft, a watercraft, a spacecraft, a land vehicle, in an HVAC system, a building, a home, or other locations where filters are utilized. In one example, the coated substrate is an HVAC filter material with a minimum efficiency reporting value (MERV) rating (MERV rating standards developed by the American Society of Heating, Refrigerating, and Air Conditioning Engineers) of MERV16 or less, such as any filter having a MERV rating of MERV1-MERV16. In this example, the coated substrate is capable of filtering particles having a particle size of between 3.0-10.0 microns at a rate of less than 20% and particles having a particle size of 0.3-1.0 microns at a rate of 75% or greater.

Processes

Embodiments of the present disclosure also relate to processes for making the coated substrates described above and to articles (e.g., filters, protective equipment, facemasks, etc.) including the coated substrates described herein. Generally, at least a portion of the substrate is contacted with the mineral oxide particles and/or the iron oxide particles and the substrate is dried and/or cured. The resultant substrate, a coated or partially coated substrate, has mineral oxide particles and/or iron oxide particles coupled thereto or otherwise on or in the substrate. The coated substrate collapses aspirated droplets containing viruses which come into contact with the coated substrate and traps or immobilize the viruses.

Use of high concentrations of mineral oxide particles and/or iron oxide particles, such as about 20 wt %, can clog the pores of the substrates, resulting in flaking. In contrast, embodiments of the processes described herein can utilize more dilute mixtures, preventing clogging and flaking.

For making coated substrates, and in some embodiments, the mineral oxide particles are introduced to the substrate in the form of a mixture (e.g., a solution or a suspension). In one example, the mixture is made by introducing the mineral oxide particles with a suitable solvent such as water and/or a polar solvent (e.g., an alcohol such as ethanol, isopropanol or a mixture thereof). The concentration of the mineral oxide particles in the mixture are from about 0.1 wt. % to about 15 wt. %, such as from about 0.3 wt. % to about 10 wt. %, such as from about 0.5 wt. % to about 5 wt. %, such as from about 1 wt. % to about 4 wt. %, such as from about 2 wt. % to about 3 wt. %. In at least one embodiment, the concentration of the mineral oxide particles in the mixture is from about 0.5 wt. % to about 10 wt. %. Higher or lower concentrations of the mineral oxide particles in the mixture are contemplated.

In some embodiments, the iron oxide particles are introduced to the substrate in the form of a mixture (e.g., a solution or a suspension). In one example, the mixture is made by introducing the iron oxide particles with a suitable solvent such as water and/or a polar solvent (e.g., an alcohol such as ethanol, isopropanol or a mixture thereof). The concentration of the iron oxide particles in the mixture can be from about 0.1 wt. % to about 15 wt. %, such as from about 0.3 wt. % to about 10 wt. %, such as from about 0.5 wt. % to about 5 wt. %, such as from about 1 wt. % to about 4 wt. %, such as from about 2 wt. % to about 3 wt. %. In at least one embodiment, the concentration of the iron oxide particles in the mixture is from about 0.5 wt. % to about 10 wt. %. Higher or lower concentrations of the iron oxide particles in the mixture are contemplated.

In some embodiments, the iron oxide particles and mineral oxide particles are introduced to the substrate in the form of a mixture (e.g., a solution or a suspension). In one example, the mixture is made by introducing the iron oxide particles and mineral oxide particles with a suitable solvent such as water and/or a polar solvent (e.g., an alcohol such as ethanol, isopropanol or a mixture thereof). The concentration of the iron oxide particles and mineral oxide particles in the mixture can be from about 0.1 wt. % to about 15 wt. %, such as from about 0.3 wt. % to about 10 wt. %, such as from about 0.5 wt. % to about 5 wt. %, such as from about 1 wt. % to about 4 wt. %, such as from about 2 wt. % to about 3 wt. %. In at least one embodiment, the concentration of the iron oxide particles and mineral oxide particles in the mixture is from about 0.5 wt. % to about 10 wt. %. Higher or lower concentrations of the iron oxide particles in the mixture are contemplated.

In some embodiments, the amount (by weight) of functionalized mineral oxide particles to functionalized iron oxide particles is from about 10:1 to about 1:10, such as from about 5:1 to about 1:5, such as from about 3:1 to about 1:3, such as from about 2:1 to about 1:2. Higher or lower ratios are contemplated.

Figure 5A:
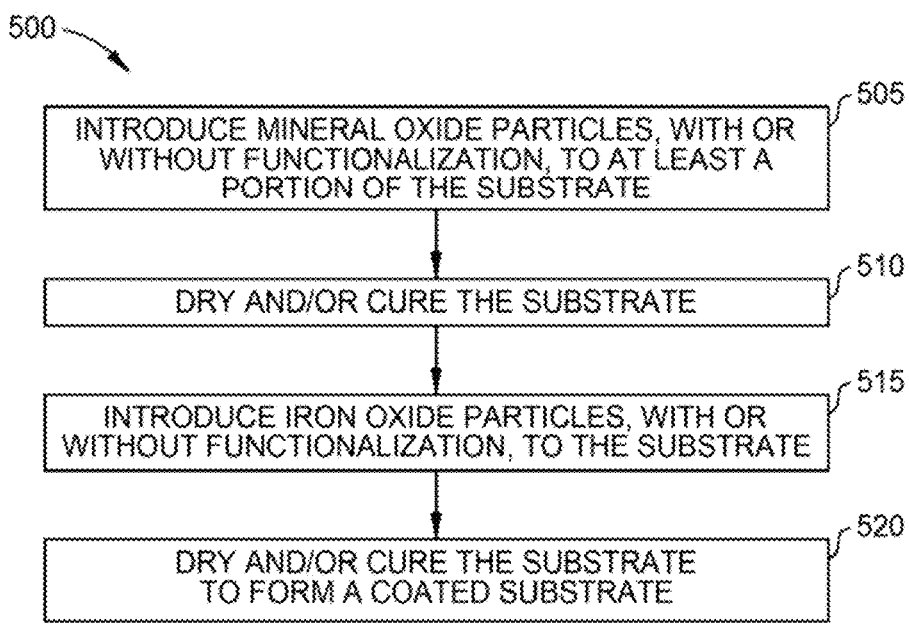
FIG. 5A illustrates an example process for forming a coated substrate according to at least one embodiment of the present disclosure.
Figure 5B:
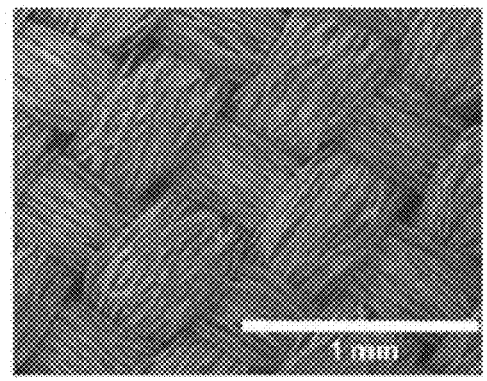
FIG. 5B is an exemplary scanning electron microscope (SEM) image of an example coated substrate according to at least one embodiment of the present disclosure.

FIG. 5A illustrates selected operations of an example process 500 for forming a coated (or at least partially coated substrate) according to at least one embodiment. The process 500 begins by introducing mineral oxide particles, with or without functionalization, with at least a portion of the substrate at operation 505. The substrate is then dried and/or cured at operation 510, and then iron oxide particles, with or without functionalization, are introduced to the substrate at operation 515. The substrate is then dried and/or cured at operation 520 to provide a coated (or at least partially coated) substrate. Each of these operations are described below. A SEM image (scale: 1 mm) of the coated substrate is shown in FIG. 5B.

Operation 505 and 515 include introducing the particles, in the form of a mixture, with the substrate. In some embodiments, the mixture that includes the mineral oxide particles is introduced to the substrate, followed by introduction of the mixture that includes the iron oxide particles to the substrate. Alternatively, and in some embodiments, the mixture that includes the iron oxide particles is introduced to the substrate, followed by introduction of the mixture that includes the mineral oxide particles to the substrate. The mixtures can be introduced to the substrate in alternating operations. Multiple introductions of mineral oxide particles and/or iron oxide particles can also be performed. Alternatively, or additionally, and in some embodiments, the mixture that includes the mineral oxide particles and the mixture that includes the iron oxide particles are introduced to the substrate simultaneously, but separately.

Additionally, or alternatively, and in some embodiments, a single mixture that includes the mineral oxide particles and the iron oxide particles is utilized. Here, the single mixture can be introduced to the substrate and then dried as described below. Using a single mixture of the mineral oxide particles and the iron oxide particles can result in a better contact angle (e.g., more hydrophilic) and/or better viral rejection. In at least one embodiment, a weight ratio of iron oxide particles to mineral oxide particles is between about 0.1:1 and about 5:1, such as between about 1:1 and about 3:1, for example, about 2:1.

Operations 510 and 520 include drying and/or curing the substrate. The substrate can be dried or cured before and/or after each introduction of mineral oxide particles and/or iron oxide particles to the substrate. Temperatures for drying/curing are selected to, e.g., provide sufficient removal of the solvent, or to ensure that the mineral oxide and iron oxide particles are no longer soluble. In addition, the temperature for drying/curing is selected to not exceed a temperature at which the particles/functionalized particles degrade or thermally decompose. Upon thermal decomposition, the particles and functionalized particles can begin to lose their hydrophilic and superhydrophilic properties. Such a thermal decomposition temperature can be determined by, e.g., thermogravimetrtic analysis of the relevant mineral oxide or iron oxide. For example, particles functionalized with cysteic acid degrade at temperatures of about 200° C. or more. In some embodiments, particles functionalized with cysteic acid are dried or cured at temperatures of less than about 200° C., such as about 180° C. or less, such as about 160° C. or less. While various functional groups can be utilized to functionalize the particles, drying/curing temperatures are typically less than about 250° C., such as from about 50° C. to about 200° C., such as from about 70° C. to about 180° C., such as from about 100° C. to about 160° C., such as from about 120° C. to about 140° C. In at least one embodiment, the drying/curing temperature is from about 80° C. to about 120° C. or from about 120° C. to about 170° C. In some embodiments, the time duration for drying/curing of operations 510 and 520 is at least about 30 seconds, such as at least about 2 minutes, such as from about 5 min to about 10 h, such as from about 30 min to about 5 h, such as from about 1 h to about 4 h, such as from about 2 h to about 3 h. Drying and/or curing can be performed to, e.g., reduce shedding.

Introduction of the mixture that includes the mineral oxide particles and the mixture that includes the iron oxide particles can be performed by suitable methods, including spray coating, dip-coating, slot-die coating, immersion, reverse roll, gravure, knife over roll, comma roll, myer rod, or a combination thereof. The introduction can be in the form of multiple introductions. For example, each mixture is introduced to the substrate two or more times, such as about 3, 4, or 5 times or more. Drying and/or curing can be performed at selected intervals, e.g., after each introduction, or after two or more introductions. Each mixture can be introduced to one side, or more than one side, of the substrate.

In some embodiments, slot-die coating or spray coating typically enable coating and drying/curing of a fabric having a web width of about 100 mm to about 1,000 mm, such as about 150 mm to about 500 mm, such as about 200 to about 400 mm, such as from about 250 mm to about 350 mm, such as from about 250 mm to about 300 mm or from about 300 mm to about 350 mm. Wider or narrower web dimensions can be configured to suit a variety of applications. In at least one example, the fabric has a web width of about 330 mm. Typical line speeds of the substrate can be from about 1 m/min to about 50 m/min, but faster or slower line speeds are also contemplated. The mineral oxide particle mixture and/or the iron oxide particle mixture can be introduced by single or multiple consecutive, or alternating, "passes" on one or more sides of the substrate.

In some embodiments, selected operations of a process for making the coated substrates include one or more of substrate unwinding, mixture/solution delivery, coating application, drying/curing (in, e.g., an oven), and dried/cured substrate rewind. During the substrate unwinding operation, the substrates can be loaded onto unwind spindles and fed into the process via, e.g., servo-controlled web conversion. During mixture/solution delivery, the mixture containing mineral oxide particles and/or the mixture containing iron oxide-containing particles can be pumped and metered to a selected coating applicator from bulk containers that are agitated by, e.g., mechanical agitation, sonic agitation, or a recycling flow of excess solution.

In order to provide a uniform coating with minimal webbing (excess material that can slough off the fabric) the use of a solution with low viscosity can be utilized. For particles of this type, this can be obtained by, e.g., the use of very low concentrations (for example, ≤2% w/w) or the addition of a surfactant. However, in the present case it is found that pre-mixing the hydrophilic component (e.g., mineral oxide component, such as alumoxane) and the iron oxide component unexpectedly results in a solution of lower viscosity as shown in Table 1A. These results indicate that a mixed solution may be coated at a higher concentration (such as ≥2% w/w) than the individual components, representing significant savings in process time at an industrial scale.

TABLE 1A

| cysteic acid-functionalized alumoxane (wt. %) | cysteic acid-functionalized ferroxane (wt. %) | FeOOH (wt. %) | Viscosity at 25° C. (cP) |
|---|---|---|---|
| — | 1 | — | 1.28 |
| — | 2 | — | 1.34 |
| 1 | — | — | 1.49 |
| 2 | — | — | 1.98 |
| 1 | 1 | — | 1.15 |
| 1 | 2 | — | 1.24 |
| — | — | 1 | 0 |
| — | — | 2 | 0 |
| 1 | — | 1 | ~0 |
| 1 | — | 2 | ~0 |

During the coating application (e.g., introduction of the mineral oxide particles-containing mixture and/or the iron oxide particles-containing mixture), a metered solution is applied to the substrate by, e.g., one or more of the following methods: spray coating, dip-coating, slot-die coating, immersion, reverse roll, gravure, knife over roll, comma roll, myer rod, or a combination thereof. As a non-limiting example, slot-die coating of the substrate with the mixture that includes the mineral oxide particles and/or the mixture that includes iron oxide particles is performed in a volumetrically-controlled manner for mixture(s) having a concentration of about 0.1 wt. % to about 15 wt. %, such as from about 0.5 wt. % to about 5 wt. %. Dependent on these and other characteristics, the coating application is determined based on, e.g., the parameters shown in Table 1B.

TABLE 1B

| Method | Delivery method | Viscosity range (cps) | Shear level | Minimum wet thickness | Maximum wet thickness |
|---|---|---|---|---|---|
| Slot-die | Volumetrically-metered | ~1-100,000 | Low to medium | ~2 μm | >1.0 mm |
| Gravure | Volumetrically-metered | ~1-5,000 | Medium to high | ~10 μm | ~0.5 mm |
| Reverse roll | Mechanically-metered | ~500-10,000 | High | ~25 μm | >1.0 mm |
| Knife over roll | Mechanically-metered | ~100-100,000 | High | ~50 μm | >1.0 mm |
| Comma roll | Mechanically-metered | ~100-100,000 | High | ~50 μm | >1.0 mm |
| Meyer rod | Mechanically-metered | ~100-100,000 | Very high | ~30 μm | >0.4 mm |

Following the coating application, the substrate is dried and/or cured in, e.g., an oven. One or more methods for drying/curing can be employed, including floatation-oven drying, roll-support drying, impinged-air drying, infrared curing, ultraviolet curing, and electron beam curing. Depending on the desired wet thickness, the dry and/or cure operation is performed at a temperature range of less than about 250° C., such as from about 50° C. to about 200° C., such as from about 70° C. to about 180° C., such as from about 100° C. to about 160° C., such as from about 120° C. to about 140° C. In at least one embodiment, the temperature of the dry and/or cure operation is from about 80° C. to about 120° C. or from about 120° C. to about 170° C. Time durations for drying/curing can be influenced by the desired line speed and the set temperature. In some embodiments, the time duration for drying/curing is at least about 30 seconds, such as at least about 2 minutes, such as from about 5 min to about 10 h, such as from about 30 min to about 5 h, such as from about 1 h to about 4 h, such as from about 2 h to about 3 h. The lengths of the stage can be any suitable length, such as from about 5 m to about 50 m. However, smaller or larger stage lengths are contemplated. Drying/curing operations can be performed in one or more oven/ curing apparatus. After drying and/or curing, the dried/cured substrate can be re-wound onto cores on, e.g., a rewind spindle.

In some embodiments, a process for making the coated substrate includes one or more of the following operations:
(a) preparing a coating mixture that includes a solvent and a carboxylic acid-functionalized alumoxane and either an iron oxide or ferroxane, the coating mixture characterized in being both hydrophilic or superhydrophilic and virus immobilizing;
(b) forming a coated substrate by using a die coater to apply the first coating mixture to a substrate;
(c) drying the coated substrate at a temperature of about 160° C. or less, such as from about 60° C. to about 140° C., where the coated substrate is in a substantially horizontal plane resulting in conversion of the wet film to a dry film. Here, the coated substrate can be dried in an arrangement where it is placed on a substantially flat surface such that the little to no parts of the substrate is sloped.

In at least one embodiment, a process for making the coated substrate includes one or more of the following operations:
(a) preparing a first coating mixture that includes a solvent and a carboxylic acid-functionalized alumoxane, the first coating mixture characterized in being hydrophilic or superhydrophilic;
(b) preparing a second coating mixture that includes a solvent and an iron oxide or carboxylic acid-functionalized ferroxane, the second coating mixture characterized as virus immobilizing;
(c) forming a coated substrate by using a die coater to apply the first coating mixture to a substrate;
(d) drying the coated substrate at a temperature of about 160° C. or less, such as from about 60° C. to about 140° C., where the coated substrate is in a substantially horizontal plane resulting in conversion of the wet film to a dry film;
(e) applying the second coating mixture to the coated substrate using a die coater; and
(f) drying the coated substrate at a temperature of about 160° C. or less, such as from about 60° C. to about 140° C., where the coated substrate is in a substantially horizontal plane resulting in conversion the wet film to a dry film.

In operations (d) and (f), the coated substrate can be dried in an arrangement where it is placed on a substantially flat surface such that the little to no parts of the substrate is sloped. In some embodiments, the iron oxide particles can be added to the substrate prior to the mineral oxide particles.

In at least one embodiment, a process for making the coated substrate includes one or more of the following operations:
(a) preparing a coating mixture that includes a solvent, iron oxide particles, and mineral oxide particles, where the iron oxide particles and/or mineral oxide particles are functionalized;
(b) applying a coating of the coating mixture to the substrate; and
(c) drying the coated substrate at a temperature of about 160° C. or less, such as from about 60° C. to about 140° C.

The coated substrate can be utilized as at least a portion of an article, e.g., a filter for air equipment, a filter for respirators, a portion of personal protective equipment, etc. as described above. The resultant substrate having mineral oxide particles, with or without functionalization, and/or iron oxide particles, with or without functionalization, coupled thereto is, e.g., flexible, re-useable, and robust. The resultant substrate provides significant protection against bacteria and viruses. For example, and in some embodiments, viral protection exceeds 75%, such as about 80% or more, such as about 90% or more such as about 95% or more, such as 99% or more, as measured by the trapping of a flow of aspirated viruses through a sample of coated substrate according to ASTM F2100. Viral protection unexpectedly occurs for both non-woven and woven materials having particles coupled thereto. Without particles, non-woven materials expectedly exhibit very low levels of viral protection (~20% or less). However, when the non-woven materials include iron oxide particles (with or without functionalization) and/or mineral oxide particles (with or without functionalization) coupled to or otherwise disposed on or in the non-woven materials, the amount of virus particle rejection unexpectedly improves to about 75% or more. Significantly, non-woven fabrics are also breathable as opposed to conventional materials used to reject virus particles.

Woven materials also show a significant improvement in viral protection, increasing from 60% (without particles) to about 75% or more when the woven materials include iron oxide particles (with or without functionalization) and/or mineral oxide particles (with or without functionalization) coupled to or otherwise disposed on or in the woven materials.

The coated (or partially coated) substrates of this disclosure are breathable materials that can be used for, e.g., masks, filters, and surfaces, and are shown to stop viral transmission through the collapse of aspirated droplets and the immobilization of the viruses. The coated (or partially coated) substrates can be applied in, e.g., healthcare and public use settings. Additionally, the coated (or partially coated) substrates are more breathable than N95 masks, and can be manufactured at low cost from commercially available substrates, including, e.g., woven materials, non-woven materials, polymers, and paper. The coated (or partially coated) substrates can also be utilized as a replacement for melt-blown media in current manufacturing operations.

Figure 5C:
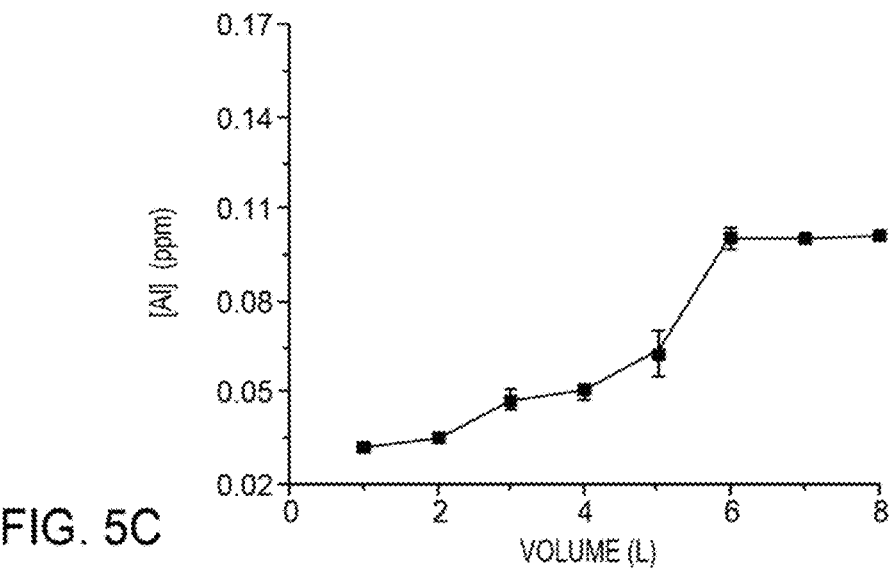
FIG. 5C is exemplary data of accumulated aluminum content from washing an example fabric with cysteic acid-functionalized alumoxane according to at least one embodiment of the present disclosure.

The coated (or partially coated) substrates can be washed with common detergents for re-use without the loss of particles or virus trapping functionality. For example, a sample of the coated substrate can be washed with successive titers of Alconox™ detergent (1 g/1000 mL) in distilled de-ionized water by passing through a 5.5 cm² diameter circle sample of the substrate. The titers were analyzed for aluminum using inductively coupled plasma optical emission spectroscopy (ICP-OES). FIG. 5C shows exemplary data of the accumulated aluminum content from washing an example substrate—a fabric with cysteic acid-functionalized alumoxane particles—according to at least one embodiment of the present disclosure. After eight liters of washing, only about 0.1 ppm of aluminum was detected in the washing solution. For each wash, no concentration over the blank reading was measured indicating that there was little to no leaching of the nanoparticle material into solution when washed using a detergent. That is, none of the material came off when washed.

Table 2A shows the results of a viral rejection test of an exemplary coated Nomex™ substrate (sample 2) of the present disclosure, a comparative uncoated Nomex™ substrate (sample 3), and a bacteria rejection test of a comparative N95 mask (sample 1). Sample 1 was tested using a bacteria concentration of $3 \times 10^5$ colony-forming units per milliliter (cfu/mL) according to BS EN 14683:2019 using bacteria (size of 2 μm) for 1 minute. The example coated substrate and the uncoated Nomex™ substrate were tested using a virus concentration of $7 \times 10^9$ plaque-forming units per milliliter (pfu/mL) using virus (size of 27 nm) according to ASTM F2100. The example coated substrate (sample 2) was exposed to a virus, which is ~100 times smaller than a bacterium, and a viral concentration of $7\times10^9$ pfu/mL, which is ~23,000 times higher than that used for bacteriological testing, for 60 minutes, as opposed to 1 minute used for bacteria testing, showed >99.99% rejection of the viruses. The example coated substrate also rejects >99.99% of bacteria. In addition, the example coated substrate exhibits a rejection of virus that is almost 5× that of the uncoated Nomex™ substrate.

TABLE 2A

| Sample | Substrate pore size (μm) | Test species | Species size | Conc. | Exposure Time (min) | Rejection (%) |
|---|---|---|---|---|---|---|
| 1 N95 | 0.75 | Bacteria | 2 μm | $3 \times 10^5$ cfu/mL | 1 | >95 |
| 2 Example alumoxane/ferroxane (1:2) dip-coated Nomex substrate | 100 | Virus | 27 nm | $7 \times 10^9$ pfu/mL | 60 | >99.99 |
| 3 Uncoated Nomex substrate | 100 | Virus | 27 nm | $7 \times 10^9$ pfu/mL | 60 | 21 |

The results in Table 2A show that not only is the example coated substrate more breathable (as evidenced by the larger pore size of the example coated substrate), but the example coated substrate rejects much smaller particles. In addition, the viral rejection is maintained after at least 1 hour and the amount of rejection is higher than the comparative samples.

Table 2B shows examples of the viral filtration efficiency (VFE, %) for single-ply spunlace samples coated with a mixture of cysteic acid-functionalized alumoxane and cysteic acid-functionalized ferroxane (Samples 6-9) in comparison with 3-ply and 4-ply uncoated spunlace (samples 4 and 5, respectively). Samples 6 and 7 were fabricated by spraying the substrate with the cysteic acid-functionalized alumoxane and cysteic acid-functionalized ferroxane separately, without or with drying in between the sprayings. Samples 8 and 9 were fabricated by spraying the cysteic acid-functionalized alumoxane and cysteic acid-functionalized ferroxane as one solution. The details of the method are described in the Examples.

TABLE 2B

| Sample | Ply | Spray separately or as one solution | VFE (%) |
|---|---|---|---|
| 4 Uncoated | 3-ply | — | 39.3 |
| 5 Uncoated | 4-ply | — | 49.8 |
| 6 Alumoxane + Ferroxane (1:2 w/w) | Single-ply | Spray separately without drying in between | 98.2 |
| 7 Alumoxane + Ferroxane (1:2 w/w) | Single-ply | Spray separately drying in between | 91.8 |
| 8 Alumoxane + Ferroxane (1:2 w/w) | Single-ply | Spray in a single solution | 99.9 |
| 9 Alumoxane + Ferroxane (1:1 w/w) | Single-ply | Spray in a single solution | 99.5 |

The results in Table 2B illustrate that uncoated multi-ply substrates show very low levels of VFE relative to the coated single-ply substrates, with the VFE for the coated substrates being greater than 2× the VFE of the uncoated multi-ply samples. Moreover, samples 6-9 show that the VFE can be modulated based on whether the substrate is dried between sprayings and/or whether the functionalized alumoxane and the functionalized ferroxane are sprayed separately or as a single solution.

As discussed above, the coated (or partially coated) substrates of the present disclosure are more breathable than conventional masks such as N95 masks and FFP-type masks. Table 3 shows breathing resistance measurements for an example coated substrate (sample 10) and three comparative FFP-type masks (samples 11-13). The example coated substrate is formed from a substrate comprising a multilayer composite of 30 g/m² non-woven spunbound polypropylene/55 g/m² non-woven polyester spunlace/30 g/m² non-woven spunbound polypropylene. Breathing resistance measurements were performed according to EN 149: 2001. The results indicate that the example coated substrate is more breathable than conventional masks.

TABLE 3

| | | Breathing resistance | | |
|---|---|---|---|---|
| | Sample | Inhalation resistance @ 10 L/min (mbar) | Inhalation resistance @ 95 L/min (mbar) | Exhalation resistance @ 160 L/min (mbar) |
| 10 | Alumoxane and ferroxane (1:2) coated 55 g/m² polypropylene spunlace | 0.21 ± 0.04 | 0.75 ± 0.12 | 1.23 ± 0.25 |
| 11 | Standard for FFP1 mask | <0.6 | <2.1 | <3.0 |
| 12 | Standard for FFP2 mask | <0.7 | <2.4 | <3.0 |
| 13 | Standard for FFP3 mask | <0.1 | <3.0 | <3.0 |

Coated substrates of the present disclosure also withstand tribological stress. The ability of the garment to stand up to tribological stress was tested using the MIT fold test (ASTM D2176-16). The washability, re-usability, and the ability to withstand physical handling demonstrate the significant impact on, e.g., the supply of filters, facemasks, etc., that the coated (or partially coated) substrates of the present disclosure can have.

The following illustrative, but non-limiting, examples are not intended to limit the scope of embodiments of the present disclosure.

Examples

Water Droplet Absorption Time. For the purpose of this disclosure and the claims, "water droplet absorption time" is defined as the time taken for the water droplet to penetrate completely into the material (e.g., fabric) after touching its surface. Water droplet absorption time was determined using an IDC GmbH video camera attached to a Krüss DSA25™ Drop Shape Analyser with a frame rate of fifty frames per second.

A 4 μL droplet of deionized water was utilized for the water droplet absorption time measurements. The water droplet was discharged from a needle (width of 0.514 mm)

by automated equipment onto test substrates (typically less than 5×5 cm$^2$). Videos were recorded while the droplets wetted the fabric and were studied to monitor the absorption. Images from the videos were captured before the water droplet touched the surface, after contact, and following absorption. Due to the camera's frame rate, the minimum absorption time that could be observed was twenty milliseconds.

ried out using 20 mg samples with a TA Instruments SDT Q600™ at a heating rate of 20° C./min from room temperature to 800° C. in air.

Table 4 shows examples of water droplet absorption time for various non-limiting substrates before and after treatment with functionalized mineral oxide particles (e.g., cysteic acid-functionalized alumoxane) or iron oxide particles (e.g., cysteic acid-functionalized ferroxane).

TABLE 4

| Substrate | Water droplet absorption time (s) or contact angle (°) before treatment | Treatment | Solution conc. (wt. %) | Number of coatings | Water droplet absorption time after treatment |
|---|---|---|---|---|---|
| polyester montana fleece white 60 | 1 s | cysteic acid alumoxane | 20 | 1 | <1 s |
| polyester poplin silver 62 | 30 s | cysteic acid alumoxane | 20 | 1 | <1 s |
| polyester montana fleece white 60 | 1 s | cysteic acid alumoxane | 5 | 3 | <1 s |
| polyester poplin silver 62 | 30 s | cysteic acid alumoxane | 5 | 3 | <1 s |
| polyester poplin silver 62 | 30 s | cysteic acid ferroxane | 5 | 1 | 2 s |
| polyester poplin silver 62 | 30 s | cysteic acid ferroxane | 5 | 3 | <1 s |
| 55 g/m$^2$ non-woven polyester spunlace | 124°-120° | cysteic acid alumoxane | 5 | 1 | <1 s |
| 55 g/m$^2$ non-woven polyester spunlace | 124°-120° | cysteic acid ferroxane | 5 | 1 | <1 s |
| 120 g/m$^2$ woven polyester/spandex blend | 147°-144° | cysteic acid alumoxane | 5 | 1 | <1 s |
| 120 g/m$^2$ woven polyester/spandex blend | 147°-144° | cysteic acid ferroxane | 5 | 1 | <1 s |

Contact Angle Measurement. Contact angle values were measured for solid-liquid interface using a Krüss DSA25™ Drop Shape Analyzer and analyzed using ADVANCE software (Krüss GmbH) equipped with the automated camera at 25° C. and 35% humidity. The sessile drop method was performed for the purpose of measuring contact angle values according to the Young-Laplace equation and a contour-fitting algorithm. Each of the contact angle measurements was performed three times to minimize standard errors.

Contact angles were measured when water droplet absorption time could not be measured, as there was no visual evidence that water was absorbed into the fabric. Since contact angles and water droplet absorption time were used to measure hydrophilicity, and contact angles were used when there was no visual evidence of water absorption into a fabric, one can compare the hydrophilicity between the values. As shown by, e.g., the experimental results, the coatings (of particles) made the fabric more hydrophilic and caused water droplets to collapse and absorb into the fabric.

Metal content was analysed by ICP-OES carried out using an Optima 4300 DV spectrophotometer (Perkin Elmer Inc.) analyzer with an AS-93 plus auto sampler.

SEM images and the associated EDX analysis were obtained with a Hitachi TM3000™ Tabletop Scanning Electron Microscope. Surface atomic ratio was calculated using the EDX spectrum and EDS software. The synthesized powder samples were characterized using a Thermo Scientific Nicolet™ iS10™ Fourier transform infrared (FT-IR) spectrometer. Thermogravimetric analysis (TGA) was car- Viral Testing. For the purposes of the claims, viral testing was performed as follows: Each specimen of the materials tested was placed in an air tight chamber (2.44 m×0.3 m×0.3 m) at a distance of 2 m from a nebulizer containing 20 mL of MS2 solution at concentrations >3.5×10$^{11}$ pfu/mL. Using positive pressure at 10-20 L/min, the MS2 was aerosolized to achieve saturation in the first chamber section. Once the nebulizer side of the chamber reached saturation, the nebulizer pump was turned off and the impinger chain (n=3 of SKC midget glass impingers each containing 5 mL of phosphate buffered saline (PBS)) pump was turned on at a flow rate of 4 L/min and run until the equivalent volume of the nebulizer side of the chamber (180 L) was processed through the filter material and through the impinger chain. Following this, the filter material was aseptically removed from the chamber, placed into a sterile bag containing 5 mL of PBS, and agitated for 2 minutes (Seward Stomacher 400). The elutant was removed and a fresh 5 mL of PBS added to the filter and bag and the process was repeated. The elutant was used to quantify the virus captured in the filters. The chamber surface after the filter was assessed using cotton tipped swabs soaked in Letheen Broth. The swabs were used to assess two areas (floor and wall of chamber) each 10 cm×10 cm, and the swabs were vortexed on high for 5 minutes then the tip was aseptically removed from the tube. The elutant was used to quantify the virus that passed through the filters and deposited on the chamber surface. The PBS in each of the three impingers was aseptically added to one sterile conical tube. An additional 1 mL of PBS was used to rinse each impinge, which was then added to the sterile conical tube. The PBS was used to quantify the virus that passed through the filters and remained suspended in the air. The surface swabs and the impinger air represent the amount of virus available for exposure.

In an alternative method, bacteriophage MS2 (ATCC 15597-B1) and the host bacteria, *E. coli* (ATCC 15597) were originally obtained from the ATCC, LB-Lennox media and sodium bicarbonate were purchased from Fisher Scientific, and Bacto™ agar was purchased from Difco Laboratories. Ultrapure water was obtained from a Barnstead E-Pure system. All materials were sterilized by autoclave, 70% ethanol, or filtration through a 0.22 µM membrane. Bacteriophage MS2 was used as a surrogate pathogenic virus in this study and was propagated using *E. coli*. in LB-Lennox media (Fisher Scientific). 200 µL of MS2 stock solution was combined with 800 µL of an incubation of *E. coli*. This was combined with 3 mL of molten (45° C.) LB-Lennox media containing 0.7% Bacto™ Agar (Difco Laboratories) and poured onto a Petri dish containing solid LB-Lennox media with 1.5% Bacto™ Agar. The plates were incubated overnight and subsequently filled with 15 mL of 100 mM $NaHCO_3$ solution (Fisher Scientific) and gently rocked for 3 hours. The buffer was withdrawn, centrifuged at 10,900×g for 15 minutes, and the supernatant passed through a 0.22 µM-pore-size syringe filter. The virus solution measured ~$7 \times 10^9$ pfu/mL and was stored at 4° C. until use in the virus removal experiments. The virus filtration experiments were conducted by generating an aerosolized virus stream, passing the output through a Nomex™ fabric composite membrane the synthesis of which is outlined above, and collecting and enumerating the viruses that are completely transported through the system. The aerosolized virus stream was generated using a TSI Constant Output Atomizer (model 3076, Shoreview, Minn.) operating in recirculation mode. The system was sterilized by operating with 70% ethanol followed by rinsing and operation with sterile ultrapure water prior to each experiment. To conduct an experiment, the virus stock was combined with 300 mL ultrapure water (final titer ~$10^6$ pfu/mL) in the feed reservoir, which was placed in an ice bath and connected to the atomizer. A 25 mm diameter piece of fabric was cut and placed in a reusable Swinnex® filter holder (Millipore, Billerica, Mass.) which was then attached to the discharge of the atomizer. The output of the filter holder was connected to a tube, which discharged through a stone diffuser into 150 mL of ultrapure water in a tall glass jar. The discharge water was sampled before each test and every 10 minutes up to 1 hour. Viruses in the samples were enumerated by the agar overlay method.

Example 1: Commercially available 13 nm alumina nanoparticles (10 g) were dispersed in 100 mL distilled water by vigorously stirring for 10 min at room temperature. Then, cysteic acid monohydrate (28 g) was dissolved in 150 mL of distilled water and was slowly added to the alumina nanoparticle solution. This mixture was refluxed at 90° C. for 21 h. Afterwards the reaction flask was cooled to room temperature (15-25° C.). The precipitate was centrifuged, and the recovered solids were washed twice with distilled water by centrifugation for 25 min at 3800 rpm. The product was oven dried at 85° C. for 15 h. The mass of the final product, cysteic acid-functionalized alumina nanoparticles, was 12.2 g.

Figure 6:
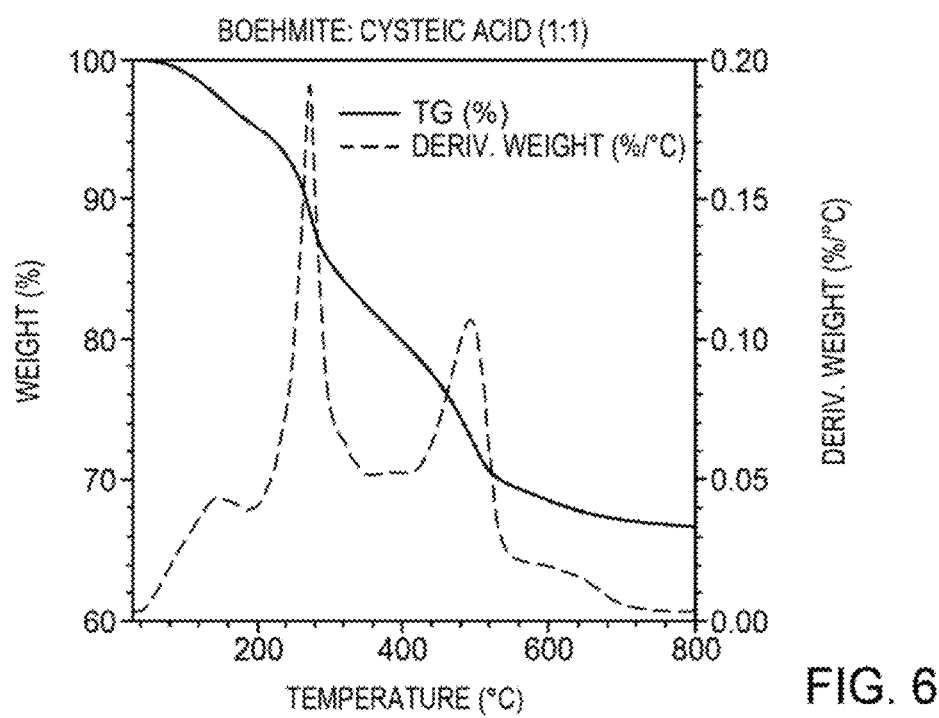
FIG. 6 is exemplary thermogravimetric/differential thermal analysis data of example cysteic acid-functionalized boehmite nanoparticles according to at least one embodiment of the present disclosure.

Example 2: Boehmite powder (10 g, 0.167 mol) was dispersed in 100 mL of deionized water. 160 mL of 1.0 M cysteic acid solution (31.26 g, 0.167 mol) was added to the boehmite suspension, resulting in the formation of a viscous slurry. 50 mL of deionized water was added to slurry. The mixture was refluxed at 90° C. for 17 hours. The reaction flask was cooled to room temperature and then centrifuged for 25 min at 3800 rpm. The precipitate was washed with deionized water and then centrifuged. The washing and centrifuging was repeated twice. Finally, the precipitate was oven dried at 85° C. for 15 hours. The mass of the final product—cysteic acid-functionalized boehmite—was 9.5 g. FIG. 6 is a thermogravimetric/differential thermal analysis measurement of cysteic acid-functionalized boehmite nanoparticles heated from 50-800° C. under air at 20° C./min, prepared with a boehmite to cysteic acid ratio of 1:1.

Example 3: 1.5 L of a 1.0 M $FeCl_2.4H_2O$ solution was magnetically stirred for approximately 15 minutes. Following this, 1.5 L of a 1.67 M aqueous NaOH solution was added dropwise over a period of approximately 4.5 hours. During the addition, the color of the reaction suspension changed from orange to black, and then to blue towards the end of the reaction time. 1.2 L of a 1.0 M aqueous cysteic acid solution was added to the ferroxane/NaOH suspension and the mixture was heated to between 90° C. and 100° C. The mixture was magnetically stirred for 16 hours at this temperature. Once the reaction time had elapsed, the mixture was cooled in air for approximately three hours. Following this, the mixture was centrifuged at 3800 rpm for one hour to recover the solid. The supernatant was discarded. The resulting nanoparticle slurry was dried at 90° C. overnight. The resulting cysteic acid-functionalized ferroxane was retrieved as a black solid weighing approximately 44.5 g.

Example 4: 1.5 L of a 1.0 M $FeCl_2.4H_2O$ solution was magnetically stirred for approximately 15 minutes. Following this, 1.5 L of a 1.67 M aqueous NaOH solution was added dropwise over a period of approximately 4.5 hours. During the addition, the color of the reaction suspension changed from green to black, and then to blue towards the end of the addition. 1.2 L of a 1.0 M aqueous cysteic acid solution was then added to the ferroxane/NaOH suspension and the mixture was heated to between 90° C. and 100° C. The mixture was magnetically stirred for 16 hours at this temperature. The mixture was observed to change color from blue to black after addition of the cysteic acid solution. Once the reaction time had elapsed, the mixture was cooled for approximately three hours at room temperature. Following this, the mixture was centrifuged at 3800 rpm for one hour to recover the solid and the supernatant was discarded. The nanoparticle slurry was dried at 90° C. for approximately 16 hours. The resulting cysteic acid-functionalized ferroxane was retrieved as a black solid weighing approximately 32.3 g.

Example 5: 3.0 L of a 1.0 M $FeCl_2.4H_2O$ solution was magnetically stirred for approximately 15 minutes. Following this, 3.0 L of a 1.67 M aqueous NaOH solution was added dropwise over a period of approximately 4 hours, at a rate of about 400 mL per hour. During the addition, the color of the reaction suspension changed from green to black, and then to blue towards the end of the reaction time. Once the reaction time had elapsed, 2.4 L of a 1.0 M aqueous cysteic acid solution was added to the ferroxane/NaOH suspension and the mixture heated to between 90° C. and 100° C. The mixture was magnetically stirred for 16 hours at this temperature. The mixture was observed to change color from blue to black after addition of the cysteic acid solution. The reaction mixture was then cooled for approximately three hours at room temperature. Following this, the mixture was centrifuged at 3800 rpm for one hour to recover the solid and the supernatant discarded. The nanoparticle slurry was dried at 90° C. for approximately 16 hours. The resulting cysteic acid-functionalized ferroxane was retrieved as a black solid weighing approximately 63.2 g.

Figure 7:
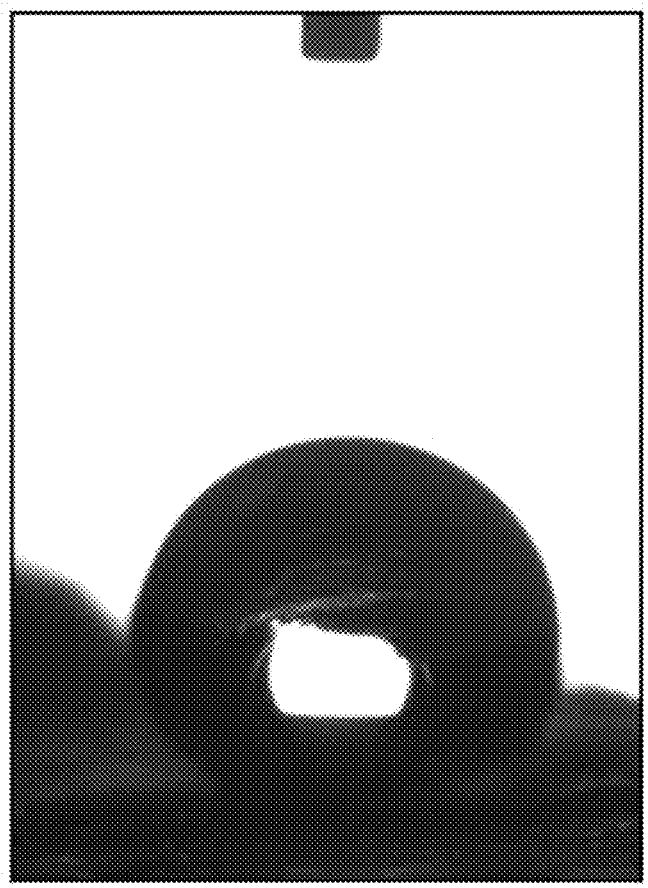
FIG. 7 is an exemplary image of a 4.0 μL water droplet on an uncoated 55 g/m² non-woven polypropylene spunlace fabric, where the width of the needle (at the top of the image) is approximately 0.514 mm.

Example 6: A piece of 55 g/m² non-woven polypropylene spunlace fabric (3×3 cm²) was spray coated with a 1 wt. % aqueous suspension of cysteic acid-functionalized 13 nm alumina nanoparticles (Example 1) for approximately 1 second. This was carried out using an artist's spray gun and hydrocarbon airbrush propellant. Two subsequent layers were then sprayed onto the fabric for similar amounts of time. The fabric was then dried by heating the fabric to 100° C. for 20 minutes. Prior to coating, the fabric was hydrophobic and exhibited a water contact angle of approximately 147-148°. The fabric was observed to have been made superhydrophilic as a result of the nanoparticle deposition and a 4.0 water droplet was observed to be absorbed into the fabric within ~102 ms. Absorption of the droplet into the fabric was monitored using a video camera attached to a Krüss DSA 25 Drop Shape Analyzer. FIG. 7 is a photographic image of a 4.0 µL water droplet on the as-received 55 g/m² non-woven polypropylene spunlace fabric, where the width of the needle (at the top of the image) is approximately 0.514 mm.

Example 7: A piece of 55 g/m² non-woven polypropylene spunlace fabric (3×3 cm²) was spray coated with a 5 wt. % aqueous suspension of cysteic acid-functionalized 13 nm alumina nanoparticles (Example 1) for approximately 1 second. This was carried out using an artist's spray gun and hydrocarbon airbrush propellant. Two subsequent layers were then sprayed onto the fabric for similar amounts of time. The fabric was then dried by heating the fabric to 100° C. for 20 minutes. Prior to coating, the fabric was hydrophobic and exhibited a water contact angle of approximately 147-148°. The fabric was observed to have been made superhydrophilic as a result of the nanoparticle deposition and a 4.0 water droplet was observed to be absorbed into the fabric within ~103 ms. Absorption of the droplet into the fabric was monitored using a video camera attached to a Krüss DSA 25 Drop Shape Analyzer.

Example 8: A piece of 55 g/m² non-woven polypropylene spunlace fabric (3×3 cm²) was spray coated with a 1 wt. % aqueous suspension of cysteic acid-functionalized 13 nm alumina nanoparticles (Example 1) for approximately 1 second. This was carried out using an artist's spray gun and hydrocarbon airbrush propellant. Two subsequent layers were then sprayed onto the fabric for similar amounts of time. The fabric was then dried by heating the fabric at 100° C. for 20 minutes. Prior to coating, the fabric was hydrophobic and exhibited a water contact angle of approximately 147°. After nanoparticle deposition the water contact angle was 88.2°. Table 5 shows the elemental analysis range from two different areas of the 55 g/m² non-woven polyester fabric spray coated with 1 wt. % cysteic acid-functionalized alumoxanes. The data illustrates that the cysteic acid-functionalized alumoxanes are on the fabric.

TABLE 5

| Element | Weight % | Atomic % |
| --- | --- | --- |
| Al | 3.62-4.21 | 1.89-2.21 |
| C | 45.57-45.90 | 53.52-54.10 |
| N | ~0.00 | ~0.00 |
| O | 48.84-50.32 | 43.22-44.37 |
| S | 0.49-1.06 | 0.22-0.47 |

Figure 8A:
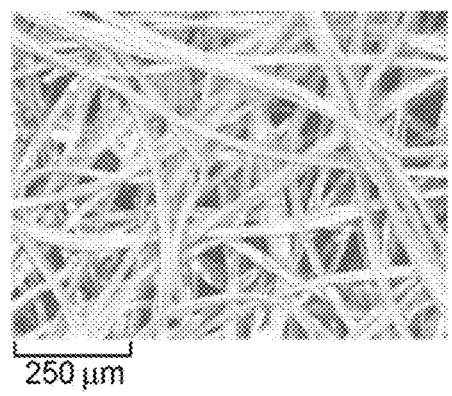
FIG. 8A is an exemplary SEM image of an example coated substrate according to at least one embodiment of the present disclosure.
Figure 8B:
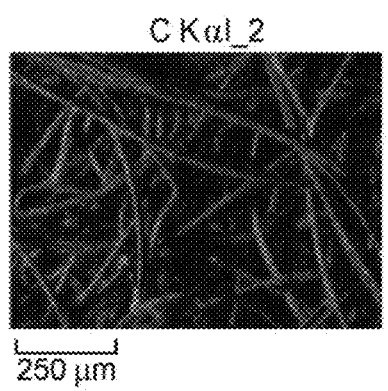
FIG. 8B is an exemplary energy dispersive X-ray (EDX) map illustrating carbon content of the coated substrate of FIG. 8A according to at least one embodiment of the present disclosure.
Figure 8C:
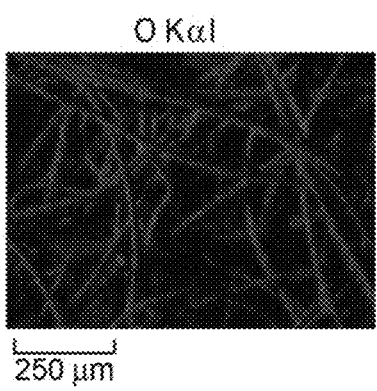
FIG. 8C is an exemplary EDX map illustrating oxygen content of the coated substrate of FIG. 8A according to at least one embodiment of the present disclosure.
Figure 8D:
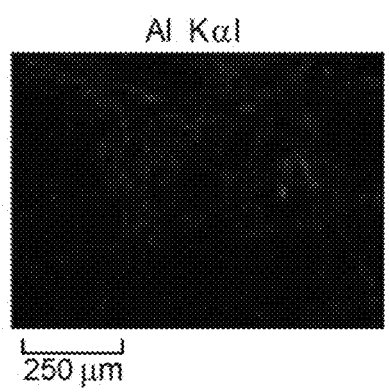
FIG. 8D is an exemplary EDX map illustrating aluminum content of the coated substrate of FIG. 8A according to at least one embodiment of the present disclosure.
Figures 8E, 8F:
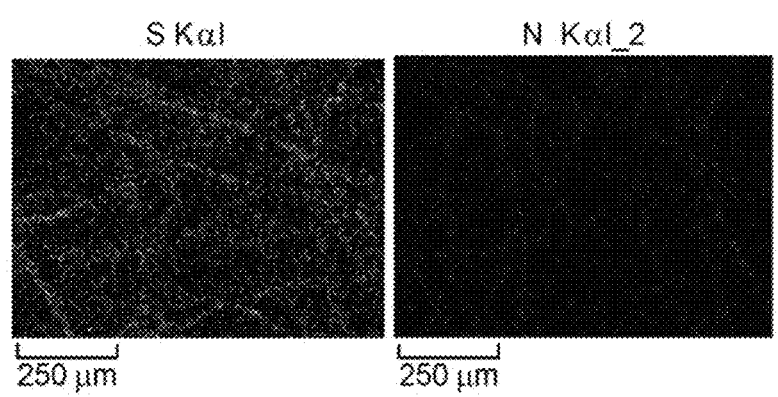
FIG. 8E is an exemplary EDX map illustrating sulfur content of the coated substrate of FIG. 8A according to at least one embodiment of the present disclosure.
FIG. 8F is an exemplary EDX map illustrating nitrogen content of the coated substrate of FIG. 8A according to at least one embodiment of the present disclosure.

FIG. 8A is an SEM image of an example coated substrate according to at least one embodiment of the present disclosure. FIGS. 8B-8F are energy dispersive x-ray maps of selected elements (carbon, oxygen, aluminum, sulfur, and nitrogen, respectively in FIGS. 8B, 8C, 8D, 8E, and 8F) for Example 8. The SEM images and energy dispersive x-ray maps were acquired at 15 kV with 10 minutes of acquisition time for a piece of 55 g/m² non-woven polypropylene spunlace fabric spray coated with 1 wt. % cysteic acid-functionalized alumoxane nanoparticles showing the presence of nitrogen and sulfur of the cysteic acid functional group associated with the aluminum of the alumoxane mineral oxide.

Figure 9:
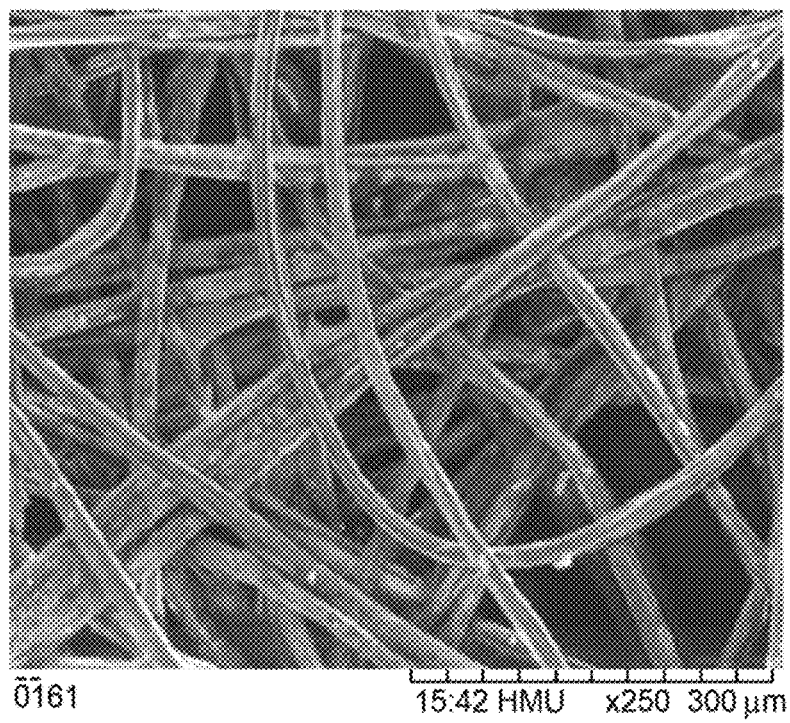
FIG. 9 is an exemplary SEM image of an example coated substrate according to at least one embodiment of the present disclosure.

Example 9: A piece of 55 g/m² non-woven polypropylene spunlace fabric (3×3 cm²) was spray coated with a 5 wt. % aqueous suspension of cysteic acid-functionalized ferroxane nanoparticles (Example 4) for approximately 1 second using an artist's spray gun and hydrocarbon airbrush propellant. Two subsequent layers were then sprayed onto the fabric for similar amounts of time. The fabric was then dried by heating the fabric to 100° C. for 20 minutes. Prior to coating, the fabric was hydrophobic and exhibited a water contact angle of approximately 147-148°. The fabric was observed to have been made superhydrophilic as a result of the nanoparticle deposition and a 4.0 µL water droplet was observed to be absorbed into the fabric within ~38 ms. Absorption of the droplet into the fabric was monitored using a video camera attached to a Krüss DSA 25 Drop Shape Analyzer. FIG. 9 is a SEM image of the coated substrate made according to Example 9.

Example 10: A piece of polyester Montana fleece white 60 fabric (3×3 cm²) was spray coated with a 5 wt. % aqueous suspension of cysteic acid-functionalized ferroxane nanoparticles (Example 4) for approximately 1 second using an artist's spray gun and hydrocarbon airbrush propellant and performed two further times. The fabric was then dried by heating the fabric at 100° C. for 20 minutes. Prior to coating, the fabric was hydrophilic and a 4.0 µL water droplet was adsorbed into the fabric in approximately 180 ms. The fabric was observed to have been made superhydrophilic as a result of the nanoparticle deposition and a 4.0 µL water droplet was observed to be absorbed into the fabric within less than ~5 s. Absorption of the droplets into the fabric was monitored using a video camera attached to a Krüss DSA 25 Drop Shape Analyzer. Here, the coating was observed to be made less hydrophilic after depositing ferroxane on the fabric surface.

Example 11: A piece of 55 g/m² non-woven polypropylene spunlace fabric (3×3 cm²) was spray coated with a 1 wt. % aqueous suspension of cysteic acid-functionalized 13 nm alumina nanoparticles (Example 1) for approximately 1 second using an artist's spray gun and hydrocarbon airbrush propellant. Two subsequent layers were then sprayed onto the fabric for similar amounts of time. The fabric was then dried by heating the fabric to 100° C. for 20 minutes. Following this, the fabric was spray coated with a 1 wt. % aqueous suspension of cysteic acid-functionalized ferroxane nanoparticles (Example 4) for approximately 1 second using the same equipment. This operation was then carried out two additional times. The fabric was then dried at 100° C. for 20 minutes. Prior to coating, the fabric was hydrophobic and exhibited a water contact angle of approximately 147-148°. The fabric was observed to have been made superhydrophilic as a result of the nanoparticle deposition and a 4.0 µL water droplet was observed to be absorbed into the fabric within ~102 ms. Absorption of the droplet into the fabric was monitored using a video camera attached to a Krüss DSA 25 Drop Shape Analyzer.

Example 12: Four 49 cm² pieces of 55 g/m² non-woven polypropylene spunlace fabric were each spray coated with about 0.8 mL of a 5 wt. % aqueous suspension of cysteic acid-functionalized 13 nm alumina nanoparticles (Example 1) using an artist's spray gun and hydrocarbon airbrush propellant. The fabric was then dried by heating the fabric to 90° C. for 10 minutes. Following this, each of the specimens were spray coated with about 0.8 mL of a 5 wt. % aqueous suspension of cysteic acid-functionalized ferroxane nanoparticles (Example 4) and then dried at 90° C. for 10 minutes. The masses of the specimens were recorded before and after the spray coating and drying processes. It was observed that the masses of the samples increased by 13-20 mg after deposition of the nanoparticles. Prior to coating, the fabric was hydrophobic and exhibited a water contact angle of approximately 147-148°. The fabric was observed to have been made superhydrophilic as a result of the nanoparticle deposition, and a 4.0 µL water droplet was observed to be absorbed into the fabric within ~10 ms. Absorption of the droplet into the fabric was monitored using a video camera attached to a Krüss DSA 25 Drop Shape Analyzer.

Example 13: A piece of 55 g/m² non-woven polypropylene spunlace fabric (3×3 cm²) was spray coated with a 5 wt. % aqueous suspension of cysteic acid-functionalized 13 nm alumina nanoparticles (1) for approximately 1 second using an artist's spray gun and hydrocarbon airbrush propellant. The fabric was then dried by heating the fabric at 100° C. for 20 minutes. Following this, the fabric was spray coated with a 5 wt. % aqueous suspension of cysteic acid-functionalized ferroxane nanoparticles (Example 4) for approximately 1 second using the same equipment. The fabric was then dried at 90-100° C. for about 20 minutes. Prior to coating, the fabric was hydrophilic and exhibited a water contact angle of approximately 145° and 150°. The fabric was observed to have been made superhydrophilic as a result of the nanoparticle deposition, and a 4.0 µL water droplet was observed to be absorbed into the fabric within ~60 ms. Absorption of the droplet into the fabric was monitored using a video camera attached to a Krüss DSA 25 Drop Shape Analyzer.

Example 14: A piece of 55 g/m² non-woven polypropylene spunlace fabric (3×3 cm²) was spray coated with a 2 wt. % aqueous suspension of cysteic acid-functionalized 13 nm alumina nanoparticles for approximately 1 second using an artist's spray gun and hydrocarbon airbrush propellant. Two subsequent layers were then sprayed onto the fabric for similar amounts of time. The fabric was then dried by heating the fabric at 100° C. for 20 minutes. The elemental analysis range, from two different areas of the 55 g/m² non-woven polyester fabric spray coated with 2 wt. % cysteic acid-functionalized alumoxane particles, is given in Table 6. The fabric was then spray coated with a 5 wt. % aqueous suspension of cysteic acid-functionalized ferroxane nanoparticles for approximately 1 second using the same equipment. This was then carried out two additional times. The fabric was then dried at 100° C. for 20 minutes. Prior to coating, the fabric was hydrophobic and exhibited a water contact angle of 125.5°. As a result of the nanoparticle deposition the hydrophilicity of the fabric was improved and a 4.0 µL water droplet was observed to be absorbed into the fabric within 2.5 seconds. The elemental analysis range, from two different areas of the of 55 g/m² non-woven polyester spunlace fabric spray coated with 2 wt. % cysteic acid-functionalized alumoxane and 5 wt. % cysteic acid-functionalized ferroxane nanoparticles, is given in Table 7. The elemental analyses shown in Table 6 and Table 7 show that the cysteic acid-functionalized alumoxane particles and cysteic acid-functionalized ferroxane particles are on the fabric.

TABLE 6

| Element | Weight % | Atomic % |
| --- | --- | --- |
| Al | 5.30-11.01 | 2.78-6.05 |
| C | 38.86-46.70 | 47.94-55.05 |
| N | ~0.00 | ~0.00 |
| O | 47.28-49.22 | 41.85-45.59 |
| S | 0.72-0.92 | 0.32-0.42 |

TABLE 7

| Element | Weight % | Atomic % |
| --- | --- | --- |
| Fe | 9.79-12.87 | 2.64-3.63 |
| Al | 3.24-5.35 | 1.81-3.12 |
| C | 40.01-44.17 | 52.45-55.43 |
| N | ~0.00 | ~0.00 |
| O | 41.15-42.34 | 39.90-40.49 |
| S | 0.46-0.62 | 0.22-0.30 |

Example 15: A piece of 55 g/m² non-woven polypropylene spunlace fabric (3×3 cm²) was spray coated with a 2 wt. % aqueous suspension of cysteic acid-functionalized boehmite nanoparticles (Example 2) for approximately 1 second using an artist's spray gun and hydrocarbon airbrush propellant. Two subsequent layers were then sprayed onto the fabric for similar amounts of time. The fabric was then dried by heating the fabric at 100° C. for 20 minutes. The elemental analysis range, from two different areas of the 55 g/m² non-woven polyester fabric spray coated with 2 wt. % cysteic acid-functionalized alumoxane nanoparticles, is given in Table 8. The fabric was then spray coated with a 5 wt. % aqueous suspension of cysteic acid-functionalized ferroxane nanoparticles for approximately 1 second using the same equipment. This was then carried out two additional times. The fabric was then dried at 100° C. for 20 minutes. Prior to coating, the fabric was hydrophobic exhibiting a contact angle of 125.5°, As a result of the nanoparticle deposition the hydrophilicity of the fabric was improved and a 4.0 µL water droplet was observed to be absorbed into the fabric within 1.6 seconds. The elemental analysis range, from two different areas of the 55 g/m² non-woven polyester fabric spray coated with 2 wt. % cysteic acid-functionalized boehmite nanoparticles and 5 wt. % cysteic acid-functionalized ferroxane nanoparticles, is given in Table 9. The elemental analysis shown in Table 8 and Table 9 show that the cysteic acid-functionalized alumoxane particles and cysteic acid-functionalized boehmite particles are on the fabric.

TABLE 8

| Element | Weight % | Atomic % |
| --- | --- | --- |
| Al | 4.22-7.43 | 2.21-3.97 |
| C | 43.66-45.91 | 52.40-54.06 |
| N | ~0.00 | ~0.00 |
| O | 47.94-49.03 | 43.19-43.35 |
| S | 0.85-0.97 | 0.37-0.44 |

TABLE 9

| Element | Weight % | Atomic % |
| --- | --- | --- |
| Fe | 10.61-12.79 | 2.88-3.54 |
| Al | 3.36-3.75 | 1.89-2.15 |
| C | 42.97-44.09 | 55.35-55.69 |
| N | ~0.00 | ~0.00 |
| O | 40.05-41.47 | 38.74-39.32 |
| S | 0.44-0.46 | 0.21-0.22 |

Figure 10:
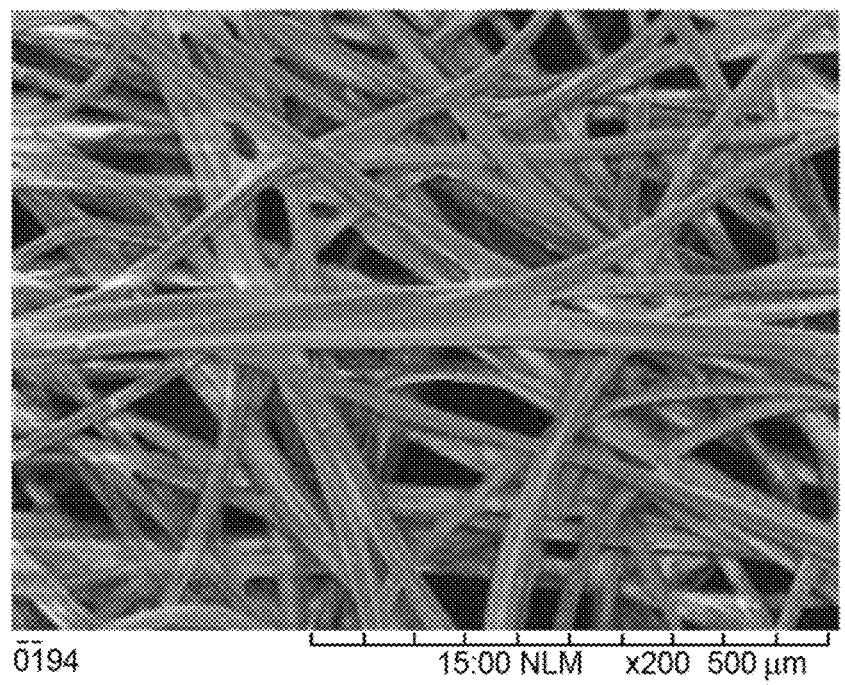
FIG. 10 is an exemplary SEM image of an example coated substrate according to at least one embodiment of the present disclosure.
Figure 11:
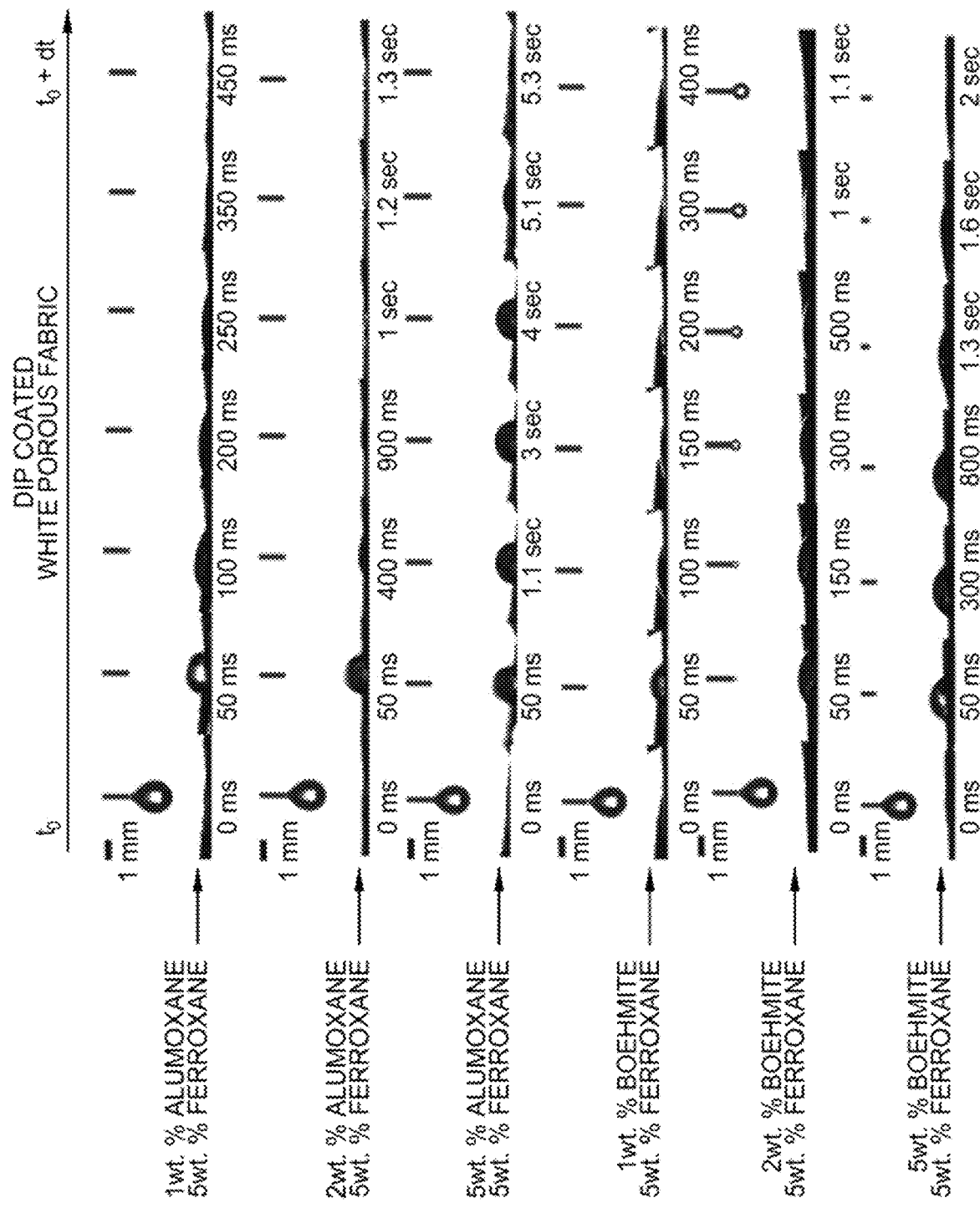
FIG. 11 shows exemplary time-lapsed photographic images of water droplets on an example coated substrate according to at least one embodiment of the present disclosure.
Figure 12:
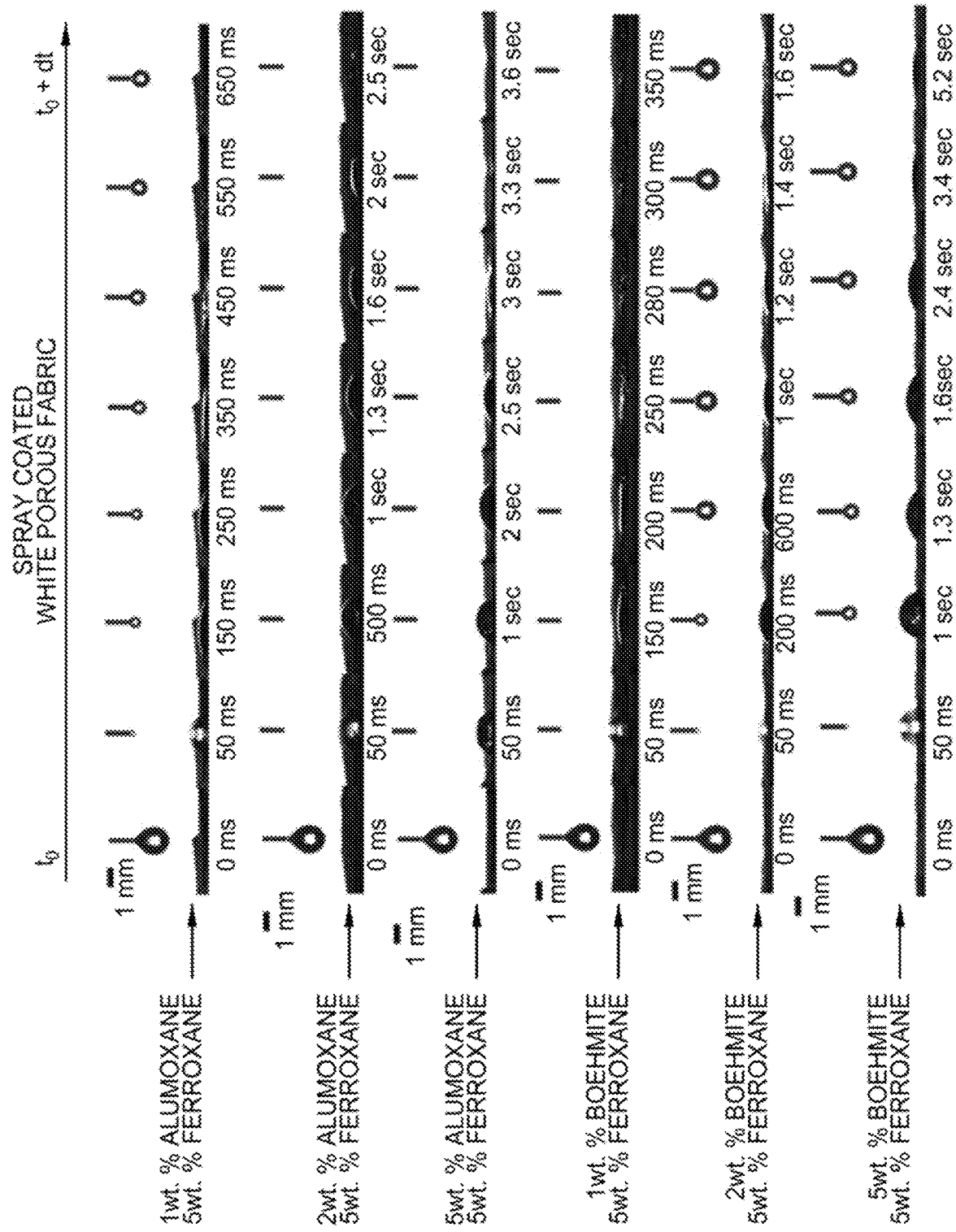
FIG. 12 shows exemplary time-lapsed photographic images of water droplets on example coated substrates according to at least one embodiment of the present disclosure.
Figure 13:
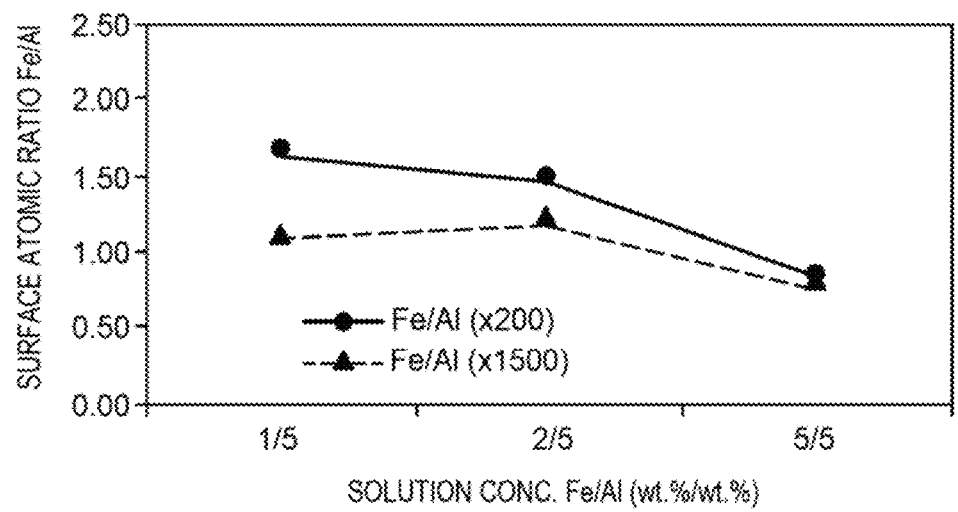
FIG. 13 is an exemplary plot of surface atomic ratio of Fe/Al of an example coated substrate according to at least one embodiment of the present disclosure.
Figure 14:
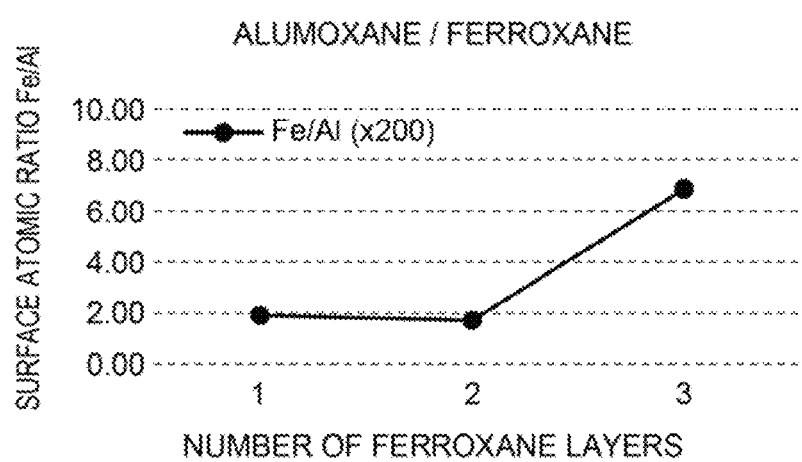
FIG. 14 is an exemplary plot of surface atomic ratio of Fe/Al on the surface of an example coated substrate according to at least one embodiment of the present disclosure.
Figure 15:
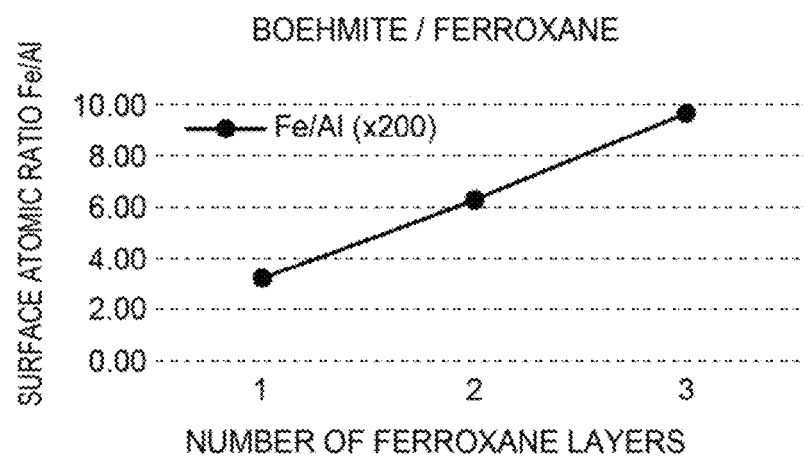
FIG. 15 is an exemplary plot of surface atomic ratio of Fe/Al on the surface of an example coated substrate according to at least one embodiment of the present disclosure.
Figures 16A, 16B, 16C:
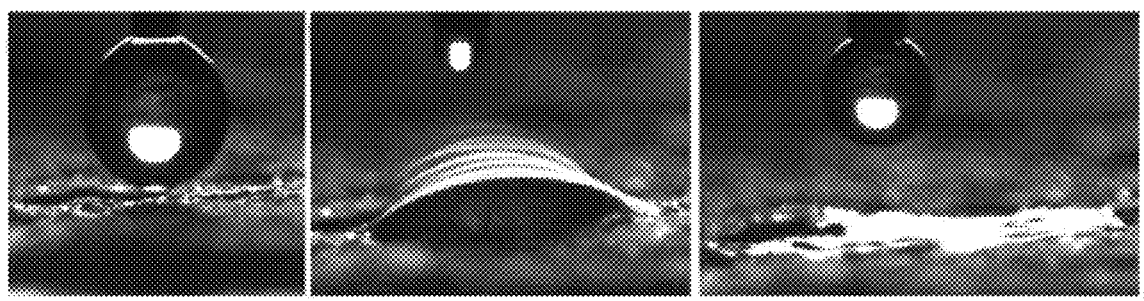
FIGS. 16A-16C are exemplary photographic images showing the absorption of a 4.0 μL droplet from a needle (width of 0.514 mm) onto an example coated fabric at different time points according to at least one embodiment of the present disclosure.

FIG. 10 is a SEM image of the example coated substrate in Example 15 after spray coating with 2 wt. % cysteic acid-functionalized boehmite nanoparticles, but before spray coating with 5 wt. % cysteic acid-functionalized ferroxane nanoparticles.

Example 16: A piece of 30 g/m² non-woven spunbound polypropylene fabric (3×3 cm²) was dip coated in 20 wt. % aqueous suspension of cysteic acid-functionalized 13 nm alumina nanoparticles (Example 1). The fabric was then dried by heating the fabric to 100° C. for 2 hours. Following this, the fabric was spray coated with a 5 wt. % aqueous suspension of cysteic acid-functionalized ferroxane nanoparticles for approximately 1 second using an artist's spray gun and hydrocarbon airbrush propellant. Two subsequent layers of the cysteic acid-functionalized ferroxane nanoparticles were then sprayed onto the fabric for similar amounts of time. The fabric was then dried by heating the fabric to 100° C. for 2 hours. Prior to coating, the fabric was hydrophobic and exhibited a water contact angle of 113°. As a result of the nanoparticle deposition the fabric became hydrophilic and showed a water contact angle of 53°. The elemental analysis of 30 g/m² non-woven spunbound polypropylene fabric dip coated with 20 wt. % cysteic acid-functionalized alumoxane and then spray coated with 5 wt. % cysteic acid-functionalized ferroxane nanoparticles is given in Table 10. The elemental analysis shows that the particles are on the fabric.

TABLE 10

| Element | Weight % | Atomic % |
| --- | --- | --- |
| Fe | 6.63 | 1.64 |
| Al | 2.50 | 1.28 |
| C | 66.28 | 76.28 |
| N | ~0.00 | ~0.00 |
| O | 23.55 | 20.35 |
| S | 1.04 | 0.45 |

Example 17: A piece of 55 g/m² non-woven polyester spunlace fabric (3×3 cm²) was dip coated in 1 wt. % aqueous suspension of cysteic acid-functionalized 13 nm alumina nanoparticles (Example 1). The fabric was then dried by heating the fabric to 100° C. for 20 minutes. The elemental analysis range, from two different areas of the 55 g/m² non-woven polyester dip coated with 1 wt. % cysteic acid-functionalized alumoxane, is given in Table 11. Following this, the fabric was dip coated in 5 wt. % aqueous suspension of cysteic acid-functionalized ferroxane nanoparticles. The fabric was then dried by heating the fabric to 100° C. for 20 minutes. Prior to coating, the fabric was hydrophobic exhibiting a water contact angle of 125.5°. As a result of the nanoparticle deposition the hydrophilicity of the fabric was improved and a 4.0 μL water droplet was observed to be absorbed into the fabric within 450 ms. The elemental analysis range, from two different areas of the 55 g/m² non-woven polyester fabric dip coated with 1 wt. % cysteic acid-functionalized alumoxane and 5 wt. % cysteic acid-functionalized ferroxane nanoparticles, is given in Table 12. The elemental analysis shown in Table 11 and Table 12 show that the cysteic acid-functionalized alumoxane particles and cysteic acid-functionalized ferroxane particles are on the fabric.

TABLE 11

| Element | Weight % | Atomic % |
| --- | --- | --- |
| Al | 6.18-6.79 | 3.26-3.62 |
| C | 44.08-45.57 | 52.71-54.06 |
| N | 0.00 | 0.00 |

TABLE 11-continued

| Element | Weight % | Atomic % |
| --- | --- | --- |
| O | 47.57-48.17 | 42.37-43.25 |
| S | 0.68-0.96 | 0.30-0.43 |

TABLE 12

| Element | Weight % | Atomic % |
| --- | --- | --- |
| Fe | 3.53-8.30 | 0.91-2.24 |
| Al | 3.94-5.15 | 2.09-2.88 |
| C | 43.15-48.14 | 54.18-57.40 |
| N | ~0.00 | ~0.00 |
| O | 42.95-44.08 | 39.46-40.49 |
| S | 0.31-0.45 | 0.14-0.21 |

Example 18: A piece of 55 g/m² non-woven polyester spunlace fabric (3×3 cm²) was dip coated in 2 wt. % aqueous suspension of cysteic acid-functionalized boehmite nanoparticles (Example 2). The fabric was then dried by heating the fabric to 100° C. for 20 minutes. The elemental analysis range, from two different areas of the 55 g/m² non-woven polyester fabric dip coated with 2 wt. % cysteic acid-functionalized alumoxane nanoparticles, is given in Table 13. The fabric was then dip coated in 5 wt. % aqueous suspension of cysteic acid-functionalized ferroxane nanoparticles. The fabric was then dried by heating at 100° C. for 20 minutes. Prior to coating, the fabric was hydrophobic exhibiting a water contact angle of 125.5°. As a result of the nanoparticle deposition the hydrophilicity of the fabric was improved and a 4.0 μL water droplet was observed to be absorbed into the fabric within 1.1 seconds. The elemental analysis range, from two different areas of the 55 g/m² non-woven polyester fabric dip coated with 2 wt. % cysteic acid-functionalized boehmite and 5 wt. % cysteic acid-functionalized ferroxane nanoparticles, is in Table 14. The elemental analysis shown in Table 13 and Table 14 show that the cysteic acid-functionalized boehmite particles and cysteic acid-functionalized ferroxane particles are on the fabric.

TABLE 13

| Element | Weight % | Atomic % |
| --- | --- | --- |
| Al | 10.17-10.89 | 5.67-6.18 |
| C | 30.38-33.96 | 38.73-42.56 |
| N | 2.65-3.07 | 2.85-3.36 |
| O | 50.76-52.46 | 47.76-50.21 |
| S | 2.46-3.20 | 1.16-1.53 |

TABLE 14

| Element | Weight % | Atomic % |
| --- | --- | --- |
| Fe | 16.86-18.99 | 4.97-5.99 |
| Al | 5.92-10.03 | 3.62-6.55 |
| C | 26.56-35.90 | 38.97-49.22 |
| N | ~0.00-0.24 | ~0.00-0.30 |
| O | 40.68-43.31 | 41.87-47.71 |
| S | 0.65-0.87 | 0.33-0.48 |

Example 19: A sample of Nomex™ fabric (18 cm²) was washed sequentially with ethanol and acetone to remove excess dye molecules. The fabric was then vacuum dried to remove all volatiles. The fabric was dip-coated in an aqueous solution cysteic acid-alumoxane solution 20 wt. % (10 g/50 mL) and held there for between 2-5 seconds. The dip-coat was allowed to oven dry at 100° C. before repeating the procedure three times. Loading of cysteic acid-functionalized ferroxane 5 wt. % (1 g/20 mL deionized $H_2O$) onto the cysteic acid alumoxane coated Nomex™ resulted in the nanoparticle coated fabric, which was tested against aspirated MS2 bacteriophage for virus filtration.

In order to limit potential nanoparticle shedding, a similar sample as Example 19 was cured after coating with both alumoxane and ferroxane to partially convert the nanoparticles to ceramic by heating the filter to 160° C. for 2 h in an argon atmosphere. Increased loading of cysteic ferroxane 20 wt. % (5 g/20 mL) via a second coating was then undertaken onto an alumoxane-functionalized 18 $cm^2$ piece of Nomex™ fabric. The samples were characterized via XPS with an Al-Kα X-ray source (1486.6 eV) on a PHI55000 XPS, SEM-EDS, and tested as a virus filter against MS2 bacteriophage. With respect to the XPS, the survey spectrums were carried out in the range of 0-1400 eV with 1 eV step size, and 160 eV pass energy.

FIG. 11 shows exemplary time-lapsed photographic images of water droplets absorbed on coated substrates. The coated substrates were made using a 55 g/$m^2$ non-woven polyester spunlace fabric dip-coated with cysteic acid-functionalized alumoxane/ferroxane and cysteic acid-functionalized boehmite/ferroxane nanoparticles using the same method described in Examples 17 and 19.

FIG. 12 shows exemplary time-lapsed photographic images of water droplets on an example coated substrate—55 g/$m^2$ white porous fabric spray coated with cysteic acid-functionalized alumoxane/ferroxane and cysteic acid-functionalized boehmite/ferroxane nanoparticles using the same method described in Examples 14 and 15. The data indicates that the type of aluminum-containing material (e.g., alumoxane or boehmite) as well as the concentration of the aluminum-containing material can impact water absorption.

FIG. 13 shows an exemplary plot of surface atomic ratio of Fe/Al of an example coated substrate. The coated substrate is a 55 g/$m^2$ non-woven polypropylene spunlace fabric spray coated with different solution concentrations of cysteic acid-functionalized alumoxane and ferroxane nanoparticles made in a similar manner as Example 14. The ×200 and ×1500 are the magnifications of SEM when EDX was performed.

FIG. 14 shows an exemplary plot of surface atomic ratio of Fe/Al on the surface of an example coated substrate. The coated substrate is a 55 g/$m^2$ non-woven polypropylene spunlace fabric spray coated with 1 wt. % cysteic acid-functionalized alumoxane and different number of applications of 2 wt. % cysteic acid-functionalized ferroxane nanoparticles made in a similar manner as Example 14.

FIG. 15 is an exemplary plot of surface atomic ratio of Fe/Al on the surface of an example coated substrate. The coated substrate used here is a 55 g/$m^2$ non-woven polypropylene spunlace fabric spray coated with 1 wt. % cysteic acid-functionalized boehmite and different number of applications of 2 wt. % cysteic acid-functionalized ferroxane nanoparticles made in a similar manner as Example 14.

FIGS. 16A-16C show the absorption of a 4.0 μL droplet from a needle (width of ~0.514 mm) onto the example coated substrate of Example 13. Specifically, FIG. 16A is the droplet before contact with the fabric (time=0 milliseconds (ms)), FIG. 16B is the droplet on the fabric after 40 ms, and FIG. 16C is the droplet on the fabric after 120 ms.

Examples 20-22, below, illustrate coating using a mixture of the mineral oxide particles and iron oxide particles.

Example 20: Cysteic acid-functionalized alumoxane (0.8 g) and cysteic acid-functionalized ferroxane (1.6 g) were added to water (77.6 g) so that the concentrations of the metal oxide hydroxides and iron oxide hydroxides in the suspension were 1 wt. % and 2 wt. %, respectively. This mixture was sonicated in an ultrasonic bath for 30-40 minutes to break up the ferroxane into smaller pieces. The mixture was then vigorously shaken by hand and magnetically stirred overnight to create a homogeneous suspension. Following this, 20 mL of the mixture was sprayed onto a piece of 55 g/$m^2$ polyester spunlace fabric (~210×210 $mm^2$) using an artist's spray gun and hydrocarbon airbrush propellant. The fabric was then dried at 100° C. for 10-20 minutes. The spraying and drying process was then repeated for the other side of the fabric.

Example 21: Cysteic acid-functionalized alumoxane (0.8 g) and cysteic acid ferroxane (1.6 g) were added to water (77.6 g) so that the concentrations of the metal oxide hydroxides and iron oxide hydroxides in the suspension were 1 wt. % and 2 wt. %, respectively. This mixture was sonicated in an ultrasonic bath for 30-40 minutes to break up the ferroxane into smaller pieces. The mixture was then vigorously shaken by hand and magnetically stirred overnight to create a homogeneous suspension. Following this, 34 mL of the mixture was sprayed onto a piece of 55 g/$m^2$ polyester spunlace fabric (~210×210 $mm^2$) using an artist's spray gun and hydrocarbon airbrush propellant. The fabric was then dried at 100° C. for 10-20 minutes. The spraying and drying process was then repeated for the other side of the fabric.

Example 22: Cysteic acid-functionalized alumoxane (0.8 g) and cysteic acid ferroxane (1.6 g) were added to water (78.4 g) so that the concentrations of the metal oxide hydroxides and iron oxide hydroxides in the suspension were 1 wt. % and 1 wt. %, respectively. This mixture was sonicated in an ultrasonic bath for 30-40 minutes to break up the ferroxane into smaller pieces. The mixture was then vigorously shaken by hand and magnetically stirred overnight to create a homogeneous suspension. Following this, 34 mL of the mixture was sprayed onto a piece of 55 g/$m^2$ polyester spunlace fabric (~210×210 $mm^2$) using an artist's spray gun and hydrocarbon airbrush propellant. The fabric was then dried at 100° C. for 10-20 minutes. The spraying and drying process was then repeated for the other side of the fabric.

Example 23: FeOOH (1.6 g) was added to water (77.6 g) so that the concentration of the iron oxide hydroxides in the suspension was 2% wt. This mixture was vigorously shaken by hand and magnetically stirred overnight to create a homogeneous suspension. Following this, 22.5 mL of the mixture was sprayed onto a piece of 55 g/$m^2$ polyester spunlace fabric (~210×210 $mm^2$) using an artist's spray gun and hydrocarbon airbrush propellant. The fabric was then dried at 100° C. for 10-20 minutes. The spraying and drying process was then repeated for the other side of the fabric.

Example 24: Cysteic acid-functionalized alumoxane (0.8 g) was added to water (77.6 g) so that the concentrations of the alumoxane in the suspension was 1 wt. %. The mixture was then vigorously shaken by hand and magnetically stirred overnight to create a homogeneous suspension. Following this, 15 mL of the mixture was sprayed onto a piece of 55 g/$m^2$ polyester spunlace fabric (~210×210 $mm^2$) using an artist's spray gun and hydrocarbon airbrush propellant. The fabric was then dried at 100° C. for 10-20 minutes. The spraying and drying process was then repeated for the other side of the fabric.

Example 25: Cysteic acid-functionalized alumoxane (0.8 g) was added to water (77.6 g) so that the concentrations of the alumoxane in the suspension was 1 wt. %. The mixture was then vigorously shaken by hand and magnetically stirred overnight to create a homogeneous suspension referred to as mixture (1). FeOOH (1.6 g) was added to water (77.6 g) so that the concentrations of the metal oxide hydroxides in the suspension was 2 wt. %. This mixture was vigorously shaken by hand and magnetically stirred overnight to create a homogeneous suspension referred to as mixture (2). Following this, 15 mL of the mixture (1) was sprayed onto a piece of 55 g/m² polyester spunlace fabric (~210×210 mm²) using an artist's spray gun and hydrocarbon airbrush propellant. The fabric was then dried at 100° C. for 10-20 minutes. The spraying and drying process was then repeated for the other side of the fabric. Following this, the fabric was spray coated with 22.5 mL of the mixture (2) for approximately 20 s using the same equipment. The fabric was then dried at 100° C. for 10-20 minutes. The spraying and drying process was then repeated for the other side of the fabric.

Example 26: A piece of unpleated fabric (20×20 cm²) was spray coated with 10 mL of a 2 wt. % aqueous suspension of cysteic acid-functionalized alumoxane. The fabric was then dried by heating at 100° C. for 20 minutes. The fabric was then spray coated with 22.5 mL of a 2 wt. % aqueous suspension of cysteic acid-functionalized ferroxane nanoparticles and the fabric was then dried at 100° C., which was tested against aspirated MS2 bacteriophage for virus filtration showing a VFE of 99.979%.

Example 27: A piece of unpleated fabric (20×20 cm²) was spray coated with 20 mL of a 2 wt. % aqueous suspension of cysteic acid-functionalized alumoxane. The fabric was then dried by heating at 100° C. for 20 minutes. The fabric was then spray coated with 22.5 mL of a 2 wt. % aqueous suspension of cysteic acid-functionalized ferroxane nanoparticles and the fabric was then dried at 100° C., which was tested against aspirated MS2 bacteriophage for virus filtration showing a VFE of 99.989%.

Example 28: A piece of unpleated fabric (20×20 cm²) was spray coated with 20 mL of a 2 wt. % aqueous suspension of cysteic acid-functionalized alumoxane. The fabric was then dried by heating at 100° C. for 20 minutes. The fabric was then spray coated with 34 mL of a 2 wt. % aqueous suspension of cysteic acid-functionalized ferroxane nanoparticles and the fabric was then dried at 100° C., which was tested against aspirated MS2 bacteriophage for virus filtration showing a VFE of 99.867%.

Example 29: A section of 18 cm² functionalized fabric (non-woven polyester spunlace with functionalized alumoxane and functionalized ferroxane particles) was immobilized to enable dead-end filtration. Successive 250 mL washings with de-ionized water were passed through the fabric. From each wash, a 0.5 mL aliquot was taken and analyzed using ICP-OES analysis. The ICP-OES analysis involved digestion of the aliquot in 9.5 mL of conc. $HNO_3$ for 7 days. These samples were then analyzed by ICP-OES. For detergent washing, an 18 cm² swatch of functionalized fabric was washed successively in 250 mL aliquots the detergent (1 mL of Alconox™ detergent diluted in 1000 mL of deionized water). ICP-OES analysis for detergent analysis utilized a 0.5 mL aliquot of each wash digested in $HNO_3$ and analyzed by ICP-OES.

Figure 17A:
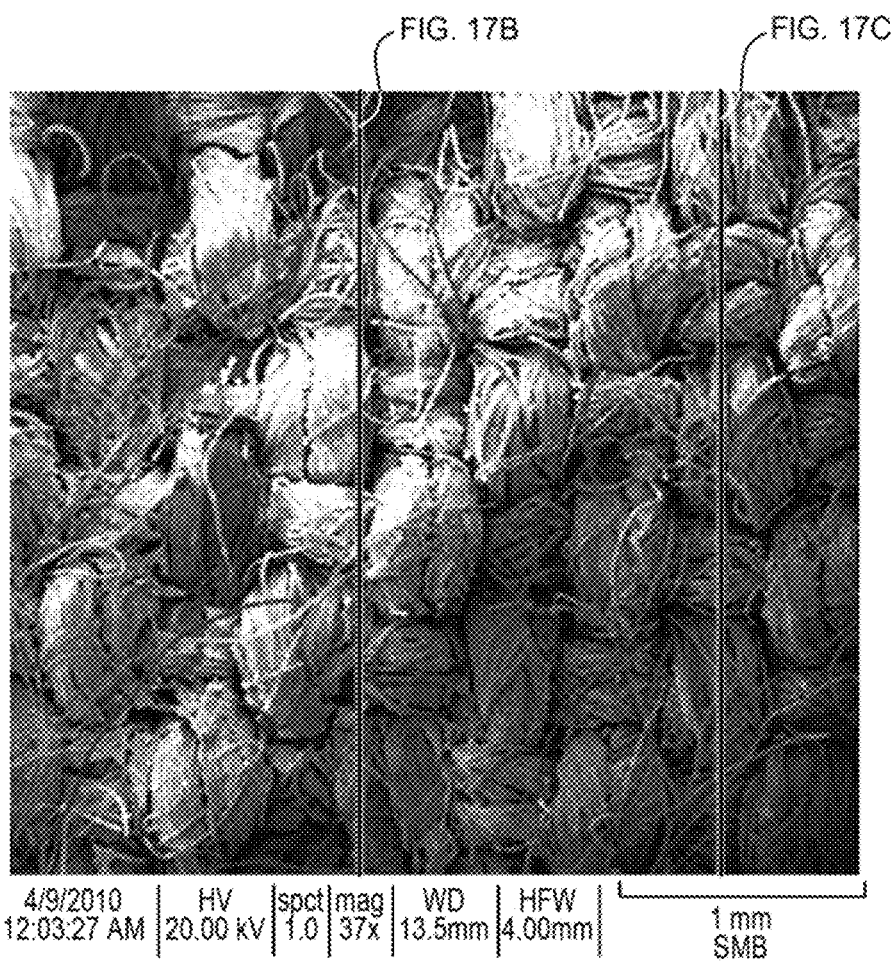
FIG. 17A is an exemplary SEM image of an example functionalized mineral oxide-coated fabric after 160 folds according to at least one embodiment of the present disclosure.
Figure 17B:
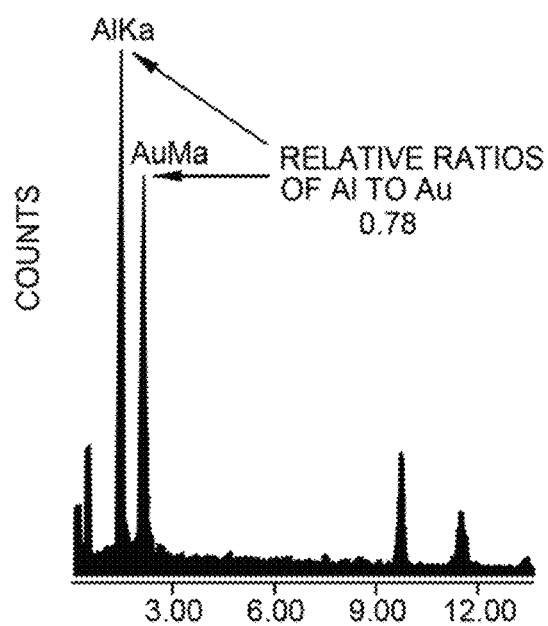
FIG. 17B (left line in FIG. 18A) is an EDX analysis of the inside crease of the folded fabric of FIG. 17A.
Figure 17C:
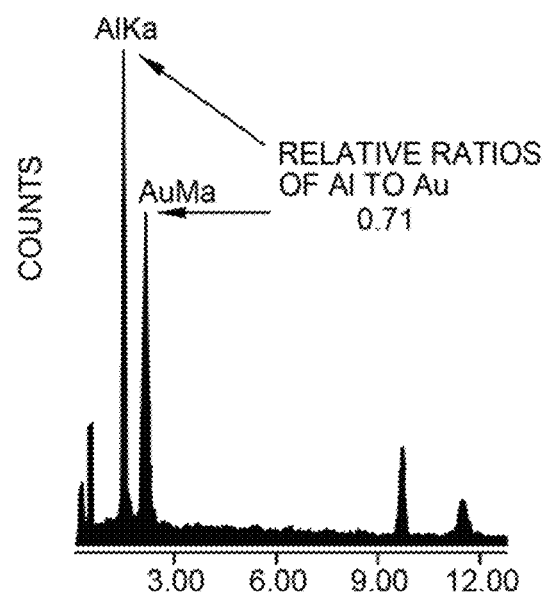
FIG. 17C (right line in FIG. 18A) is an EDX analysis of the outside crease of the folded fabric of FIG. 17A.

Example 30: Alumoxane and ferroxane coated substrates of the present disclosure also withstand tribological stress. The ability of the garment to stand up to tribological stress was tested using the MIT fold test (ASTM D2176-16). For this example, the coated substrate is a cysteic acid-functionalized alumoxane coated fabric. The coated substrate was folded on the same crease 160 times and analyzed using SEM and XRD analysis. FIG. 17A shows the SEM image of the example functionalized mineral oxide-coated fabric after 160 folds. FIG. 17B (left line in FIG. 18A) is an EDX analysis of the inside crease of the folded fabric of FIG. 17A, and FIG. 17C (right line in FIG. 18A) is an EDX analysis of the outside crease of the folded fabric of FIG. 17A.

The analysis revealed that there was negligible loss of particles from the substrate at the inside crease and the outside crease. The relative amounts of aluminum to gold were compared after 160 successive folds using EDX line techniques, both inside the crease and outside the crease. The gold was evaporated/sputtered onto the sample to reduce charging under SEM and EDX analysis. The gold is utilized as a reference. The amounts of gold and aluminum did not vary significantly.

Embodiments described herein generally relate to coated substrates having, e.g., improved anti-viral properties relative to conventional materials, to articles including the coated substrates, and to processes for making such coated substrates and articles. The coated substrates can be used for a variety of articles such as wearable garments and facemasks, and filters for air-handling equipment and HVAC systems.

The descriptions of various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable one of ordinary skill in the art to understand the embodiments disclosed herein.

For purposes of this present disclosure, and unless otherwise specified, all numerical values within the detailed description and the claims herein are modified by "about" or "approximately" the indicated value, and consider experimental error and variations that would be expected by a person having ordinary skill in the art. For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

As used herein, the indefinite article "a" or "an" shall mean "at least one" unless specified to the contrary or the context clearly indicates otherwise. For example, aspects comprising "a layer" include aspects comprising one, two, or more layers, unless specified to the contrary or the context clearly indicates only one layer is included.

For the purposes of the claims, and unless otherwise specified, breathing resistance is measured based on the coated substrate, e.g., the substrate (or fabric) with mineral oxide and/or iron oxide particles thereon. Similarly, breathing resistance is measured for the portion of the article (such as a facemask, filter, etc.) including the substrate and the mineral oxide and/or iron oxide particles thereon.

For the purposes of the claims, and unless otherwise specified, weight is measured based on the substrate or fabric without mineral oxide and/or iron oxide particles thereon.

For the purposes of this disclosure, and unless otherwise specified, the terms "hydrocarbyl radical," "hydrocarbyl group," or "hydrocarbyl" interchangeably refer to a group consisting of hydrogen and carbon atoms only. A hydrocarbyl group can be saturated or unsaturated, linear or branched, cyclic or acyclic, aromatic, or non-aromatic. For the purposes of this disclosure, and unless otherwise specified, the term "aryl" or "aryl group" interchangeably refers to a hydrocarbyl group comprising an aromatic ring structure therein.

Chemical moieties of the application can be substituted or unsubstituted unless otherwise specified. For purposes of this disclosure, and unless otherwise specified, a substituted hydrocarbyl and a substituted aryl refers to an hydrocarbyl radical and an aryl radical, respectively, in which at least one hydrogen atom has been substituted with a heteroatom or heteroatom containing group, such as with at least one functional group, such as one or more elements from Group 13-17 of the periodic table of the elements, such as halogen (F, Cl, Br, or I), O, N, Se, Te, P, As, Sb, S, B, Si, Ge, Sn, Pb, and the like, such as $NR^*_2$, $OR^*$ (e.g., OH or $O_2H$), $SeR^*$, $TeR^*$, $PR^*_2$, $AsR^*_2$, $SbR^*_2$, $SR^*$, $SO_x$ (where x=2 or 3), $BR^*_2$, $SiR^*_3$, $GeR^*_3$, $SnR^*_3$, $PbR^*_3$, and the like or where at least one heteroatom has been inserted within the hydrocarbyl radical or aryl radical such as one or more of halogen (F, Cl, Br, or I), O, S, Se, Te, $NR^*$, $PR^*$, $AsR^*$, $SbR^*$, $BR^*$, $SiR^*_2$, $GeR^*_2$, $SnR^*_2$, $PbR^*_2$, and the like, where $R^*$ is, independently, hydrogen, hydrocarbyl (e.g., $C_1$-$C_{10}$), or two or more $R^*$ may join together to form a substituted or unsubstituted completely saturated, partially unsaturated, fully unsaturated, or aromatic cyclic or polycyclic ring structure.

While the foregoing is directed to embodiments of the present disclosure, other and further embodiments of the disclosure may be devised without departing from the basic scope thereof, and the scope thereof is determined by the claims that follow.

What is claimed is:

1. A mask for reducing transmission of a virus therethrough, comprising:
    a coated substrate having a breathing resistance (95 L/min, EN 149:2001) of about 2 mbar or less and a water droplet absorption time of less than about 1 second, the coated substrate having mineral oxide particles and iron oxide particles coupled thereto, the coated substrate comprising:
        a non-woven fabric having a weight of about 120 g/m$^2$ or less according to ASTM D3776;
        the mineral oxide particles derived from a solution or suspension comprising about 0.5 wt % to about 5 wt % mineral oxide particles; and
        the iron oxide particles derived from a solution or suspension comprising about 0.5 wt % to about 5 wt % iron oxide particles, wherein the mineral oxide particles, the iron oxide particles, or both are functionalized with cysteic acid, a carboxylate thereof, or a combination thereof, wherein the mineral oxide particles are different from the iron oxide particles, and wherein about 90% or more of aspirated virus-sized particles are prevented from transmitting through the mask.

2. The mask of claim 1, wherein the mineral oxide particles, the iron oxide particles, or both, are further functionalized with 3,5-dihydroxybenzoic acid, para-hydroxybenzoic acid, malonic acid, carboxylates thereof, or combinations thereof.

3. The mask of claim 1, wherein the coated substrate has:
    a breathing resistance (10 L/min, EN 149:2001) of about 1 mbar or less;
    a breathing resistance (160 L/min, EN 149:2001) of about 3 mbar or less; or a combination thereof.

4. The mask of claim 1, wherein the coated substrate is characterized by immobilizing greater than 99% of viruses during exposure to an aspirated water solution of virus stock with a concentration of at least 10$^6$ pfu/mL for an exposure time of 60 seconds.

5. A wearable garment for reducing transmission of a virus therethrough, comprising:
    a coated substrate having a breathing resistance (95 L/min, EN 149:2001) of about 6 mbar or less, the coated substrate having mineral oxide particles and iron oxide particles coupled thereto, the coated substrate comprising:
        a substrate having a weight of about 120 g/m$^2$ or less according to ASTM D3776, the substrate comprising a non-woven fabric; and
        the mineral oxide particles and the iron oxide particles derived from a mixture, a total concentration of the mineral oxide particles and the iron oxide particles in the mixture being about 0.3 wt % to about 10 wt %, wherein the mineral oxide particles, the iron oxide particles, or both, are functionalized with an organic functional group, wherein the mineral oxide particles are different from the iron oxide particles, and wherein about 90% or more of aspirated virus-sized particles are prevented from transmitting through the wearable garment.

6. The wearable garment of claim 5, wherein the at least a portion of the substrate having the mineral oxide particles and the iron oxide particles coupled thereto is characterized by a water droplet absorption time of less than about 5 seconds.

7. The wearable garment of claim 6, wherein the water droplet absorption time is less than about 1 second.

8. The wearable garment of claim 5, wherein the organic functional group comprises cysteic acid, 3,5-dihydroxybenzoic acid, para-hydroxybenzoic acid, malonic acid, carboxylates thereof, or combinations thereof.

9. The wearable garment of claim 5, wherein the weight of the substrate is from about 60 g/m$^2$ to about to about 100 g/m$^2$.

10. The wearable garment of claim 5, wherein the coated substrate has:
    a breathing resistance (95 L/min, EN 149:2001) of about 3 mbar or less;
    a breathing resistance (10 L/min, EN 149:2001) of about 1 mbar or less;
    a breathing resistance (160 L/min, EN 149:2001) of about 3 mbar or less; or a combination thereof.

11. The wearable garment of claim 5, wherein:
    the iron oxide particles comprise ferroxane;
    the mineral oxide particles comprise alumoxane or ferroxane; or
    a combination thereof.

12. The wearable garment of claim 11, wherein:
    the ferroxane is derived from iron(III) oxide, ferric oxide, iron oxide hydroxide, lepidocrocite, goethite, siderogel, limonite, or combinations thereof; and when the mineral oxide particles comprise alumoxane, the alumoxane is derived from an aluminum oxide, alumina, aluminum oxide hydroxide, boehmite, diasporem, or combinations thereof.

13. The wearable garment of claim 5, wherein the coated substrate is characterized by immobilizing greater than 99% of viruses during exposure to an aspirated water solution of virus stock with a concentration of at least $10^6$ pfu/mL for an exposure time of 60 seconds.

14. The wearable garment of claim 5, wherein:
the mixture comprises about 0.5 wt % to about 5 wt % mineral oxide particles;
the mixture comprises about 0.5 wt % to about 5 wt % iron oxide particles; or
a combination thereof.

15. The wearable garment of claim 5, wherein:
the mineral oxide particles are functionalized mineral oxide particles comprising cysteic acid, 3,5-dihydroxybenzoic acid, para-hydroxybenzoic acid, malonic acid, carboxylates thereof, or combinations thereof;
the iron oxide particles are functionalized iron oxide particles comprising cysteic acid, 3,5-dihydroxybenzoic acid, para-hydroxybenzoic acid, malonic acid, carboxylates thereof, or combinations thereof; and
a weight ratio of the functionalized iron oxide particles to the functionalized mineral oxide particles in the mixture is from about 5:1 to about 1:5.

16. The wearable garment of claim 5, wherein a weight ratio of the iron oxide particles to the mineral oxide particles in the mixture is from about 1:1 to about 3:1.

17. A process for making a coated substrate for reducing transmission of a virus therethrough, the process comprising:
introducing a mixture comprising mineral oxide particles and iron oxide particles to a non- woven fabric, a total concentration of the mineral oxide particles and the iron oxide particles in the mixture being 0.3 wt % to about 10 wt %, the mineral oxide particles being different from the iron oxide particles; and
drying or curing the non-woven fabric to form the coated substrate, the coated substrate having a breathing resistance (95 L/min, EN 149:2001) of about 6 mbar or less, wherein about 90% or more of aspirated virus-sized particles are prevented from passing through the coated substrate.

18. The process of claim 17, wherein:
the mixture comprises about 0.5 wt% to about 5 wt% mineral oxide particles;
the mixture comprises about 0.5 wt% to about 5 wt% iron oxide particles; or
a combination thereof.

19. The process of claim 17, wherein the mineral oxide particles, the iron oxide particles, or both comprise cysteic acid, 3,5-dihydroxybenzoic acid, para-hydroxybenzoic acid, malonic acid, carboxylates thereof, or combinations thereof.

20. The process of claim 17, wherein a weight ratio of the iron oxide particles to the mineral oxide particles in the mixture is from about 1:1 to about 3:1.

* * * * *